(12) United States Patent
Kuwayama et al.

(10) Patent No.: US 6,504,518 B1
(45) Date of Patent: Jan. 7, 2003

(54) HEAD-UP DISPLAY

(75) Inventors: Yukiko Kuwayama, Kyoto (JP); Ryutaro Nasu, Kyoto (JP); Toshihiko Sugibuchi, Muko (JP)

(73) Assignee: Shimadzu Corporation, Kyoto (JP)

( * ) Notice: Subject to any disclaimer, the term of this patent is extended or adjusted under 35 U.S.C. 154(b) by 761 days.

(21) Appl. No.: 08/885,831

(22) Filed: Jun. 30, 1997

(30) Foreign Application Priority Data

Oct. 9, 1996 (JP) ................................. 8-287514

(51) Int. Cl.[7] ............................................ G09G 5/00
(52) U.S. Cl. ....................... 345/7; 345/8; 359/600; 359/631; 359/632; 359/633; 340/980
(58) Field of Search .................. 345/7, 8; 359/630, 359/629, 631, 632, 633, 637, 639; 340/980, 425

(56) References Cited

U.S. PATENT DOCUMENTS

| 3,841,544 A | | 10/1974 | Berger | |
|---|---|---|---|---|
| 4,104,627 A | | 8/1978 | Thuler | |
| 4,729,634 A | | 3/1988 | Raber | |
| 4,749,256 A | | 6/1988 | Bell et al. | |
| 5,028,119 A | * | 7/1991 | Hegg et al. | 359/632 |
| 5,237,455 A | * | 8/1993 | Bordo et al. | 359/632 |
| 5,457,575 A | * | 10/1995 | Groves et al. | 359/631 |
| 5,504,622 A | * | 4/1996 | Oikawa et al. | 359/630 |
| 5,677,701 A | * | 10/1997 | Okuyama et al. | 345/7 |

FOREIGN PATENT DOCUMENTS

| EP | 0 202 460 | 11/1986 |
|---|---|---|
| EP | 0 479 059 | 4/1992 |
| EP | 0 679 549 | 11/1995 |
| FR | 2 075 913 | 10/1971 |
| GB | 1 387 812 | 3/1975 |
| GB | 2 222 923 | 3/1990 |
| GB | 2 226 421 | 6/1990 |
| WO | 87/01211 | 2/1987 |

OTHER PUBLICATIONS

Patent Abstracts of Japan, vol. 97, No. 1 & JP 08–234199, Hitachi, Sep. 13, 1996.
Patent Abstracts of Japan, vol. 10, No. 48, Feb. 25, 1986 & JP 60–192912, Nissan, Oct. 1, 1985.

* cited by examiner

*Primary Examiner*—Julie Lieu
(74) *Attorney, Agent, or Firm*—Rader, Fishman & Grauer PLLC

(57) ABSTRACT

An optical path of image displaying light projected from an image displaying face of a display element is changed by a combiner, which is to be arranged in front of an observer. A virtual image, that is a subject of observation, is formed in front of the combiner. An optical component facing the image displaying face is provided so that the image displaying light is introduced to the combiner. The optical component is capable of diverging incident light.

13 Claims, 23 Drawing Sheets

Fig. 6
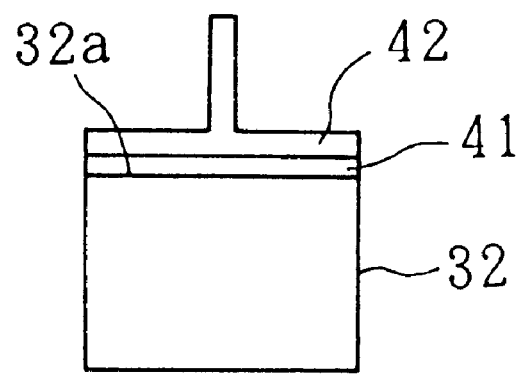
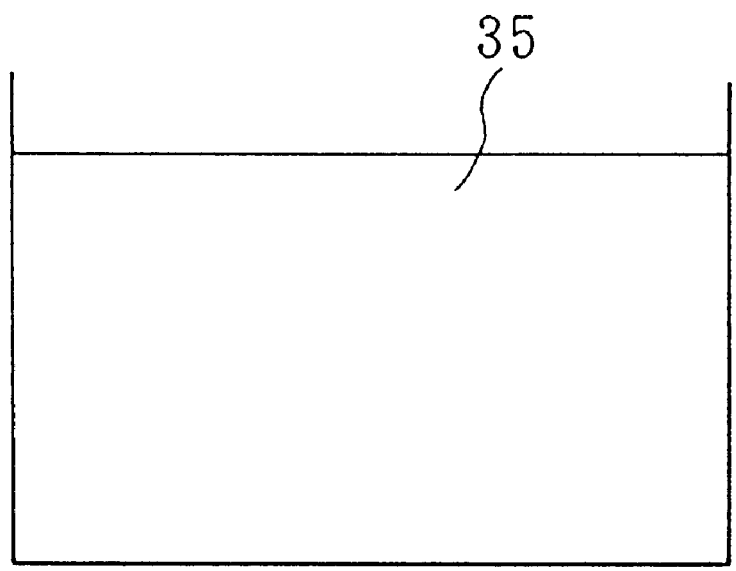

Fig. 7
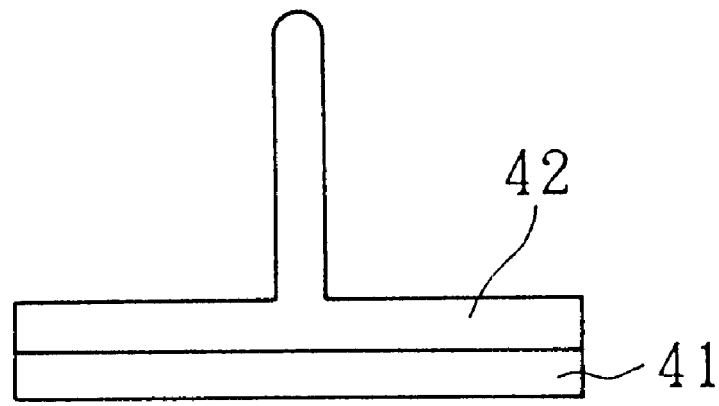
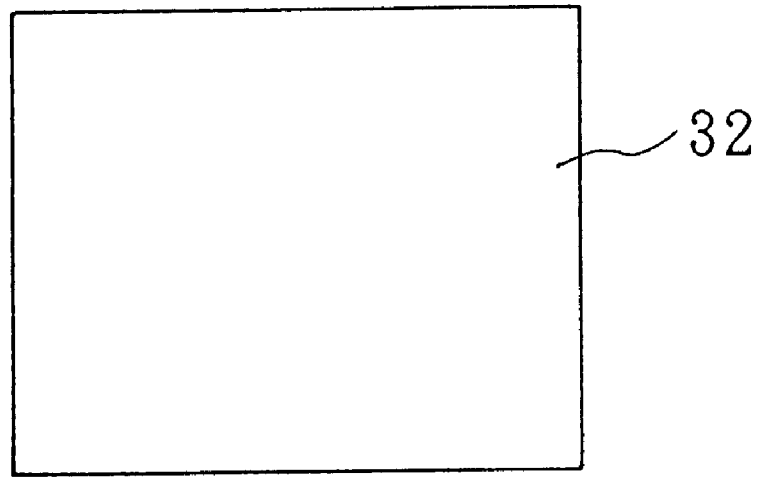

HEAD-UP DISPLAY

FIELD OF THE INVENTION

The present invention relates to a head-up display suited for mounting on vehicles such as cars and vessels.

DESCRIPTION OF RELATED ART

To provide navigation information or the like for a car driver (observer), there is used a head-up display comprising a combiner to be arranged in front of the observer and a display element which projects image displaying light from its image displaying face. By changing the optical path of the image displaying light by the combiner, a virtual image, that is a subject of observation, is formed in front of the combiner. A landscape in front of the combiner can be visually recognized by the light which passes through the combiner.

When the optical path of the image displaying light from the display element is changed directly by the combiner, the distance from the observer to the position, at where the virtual image is formed, shortens, because the optical path of the image displaying light between the display element and the observer's pupil shortens. This extends the time required to change the observer's condition from watching the actual landscape in front of the car to recognizing the virtual image. This is undesirable for vehicle driving. When the distance between the display element and the combiner is increased to lengthen the optical path of the image displaying light from the display element to the observer's pupil, the problem of increased size of the head-up display is generated.

To resolve this problem, a mirror facing the image displaying face can be provided. By introducing image displaying light to the combiner by reflecting the image displaying light by the mirror's reflecting surface, the optical path of the image displaying light can be lengthened in a given space without increasing the size of the head-up display.

However, the reflecting surfaces of the conventional mirrors are flat or concave. Therefore, the external light, such as solar light, which passes through the combiner, is focused in a narrow range on the image displaying face by being reflected by the mirror. The infrared rays contained in the external light are then absorbed in the image displaying face, resulting in heat concentration on the image displaying face and hence the problems of displaying performance reduction etc are generated.

The object of the present invention is to provide a head-up display free of the above-described problems.

SUMMARY OF THE INVENTION

The present invention relates to a head-up display comprising a combiner to be arranged in front of an observer; and a display element which projects image displaying light from its image displaying face; wherein a virtual image, that is a subject of observation, is formed in front of the combiner by changing the optical path of the image displaying light by the combiner; and wherein an optical component facing the image displaying face is provided so that the image displaying light can be introduced to the combiner by changing the optical path of the image displaying light.

The present invention is characterized in that the optical component is capable of diverging incident light.

According to the constitution of the present invention, the external light, such as solar light, which passes through the combiner, is diverged on the optical path changing face of the optical component. Therefore, the external light does not focus in a narrow range, so that heat concentration on the image displaying face by the infrared rays contained in the external light is mitigated.

In the head-up display of the present invention, it is preferable that the optical path changing face of the optical component is arranged so as to be inclined with respect to the vertical direction to allow the image displaying light to ascend as the light goes forward by changing the optical path; and that the image displaying face is arranged so as to be inclined with respect to the vertical direction to allow itself to depart from the optical component as it descends.

By this constitution, the external light, such as solar light, which passes through the combiner, can be prevented from going toward the observer after its optical path is changed on the image displaying face.

In the head-up display of the present invention, it is preferable that the optical path changing face of the optical component change the optical path of the external light, which passes through the combiner, so that the external light does not again go to the combiner.

By this constitution, the external light can be prevented from reaching the observer's pupil.

According to the present invention, a head-up display of good visibility, which can reduce the amount of infrared rays contained in the external light absorbed in the image displaying face and can prevent the displaying performance reduction, can be provided.

In the head-up display of the present invention, it is preferable that the optical path of the image displaying light, which is projected from any one point of the display element, from the optical component to the combiner is located above the optical path of the image displaying light from the projection point to the optical component and also below the optical path of the image displaying light from the combiner to the observer's pupil.

By this constitution, the display element can be placed as close to the combiner as possible. Therefore, the head-up display can be made more compact, so that it is suited for installation in the narrow space inside a car compartment.

In the head-up display of the present invention, it is preferable that the combiner comprises a body, and a reflecting layer which covers one face of the body, that at least one side of the body is configured with a platy material made of synthetic resin, that the platy material is covered with a coating which is harder and smaller in thermal expansion coefficient than the platy material, that the reflecting layer is formed on the coating, that the reflecting layer is configured with a plurality of laminated films, which are smaller in thermal expansion coefficient than the platy material and have mutually different refractive indexes, and that each of the films has residual compressive stress at normal temperature.

According to the above-described constitution, the deterioration of the combiner due to swelling and solar light exposure can be prevented by covering the platy material of synthetic resin constituting the body by a coating which is harder and smaller in thermal expansion coefficient than the platy material. Because the reflecting layer, which is configured with a plurality of films, is formed on the coating, the reflecting layer can be prevented from cracking and peeling from the body. Thereby, the combiner is of high reflectance and high transparency. Moreover, because each of the films constituting the reflecting layer has residual compressive stress at normal temperature, internal tensile stress can be prevented from being exerted on the reflecting layer, even if the body is expanded, whereby the reflecting layer can be prevented from peeling and cracking.

In the head-up display of the present invention, it is preferable that the image displaying light is projected from a liquid crystal display element having a backlight device, that the light source for backlight of the liquid crystal display device has a fluorescent tube, a driving circuit for the fluorescent tube, a lead which connects the fluorescent tube to the driving circuit, and a support portion, that the light source for backlight is made as a unit attachable to, and detachable from a housing which houses the liquid crystal display element, that the fluorescent tube is supported by the support portion so that it is arranged in a space outside the support portion, that the driving circuit and the lead are arranged in a space inside the support portion, and that the outer surface of the support portion serves as a backlight reflecting surface which reflects the light beam for backlight generated by the fluorescent tube.

According to this constitution, replacement of the bulb of a damaged or expiring fluorescent tube is facilitated by removing the light source for backlight from the housing.

Because the above-described driving circuit and lead are arranged in the space inside the support portion, they are shielded against water droplets, foreign substances, etc., and prevented from damaging.

Because the fluorescent tube is supported by the support portion and because the outer surface of the support portion constitutes the backlight reflecting surface, the driving circuit can be placed as close to the fluorescent tube as possible, whereby the light source for backlight can be made more compact. Also, because the lead which connects the driving circuit and the fluorescent tube can be shortened, startability reduction can be prevented.

Preferably, at least the outer surface of the support portion is configured with a shielding material capable of shielding electromagnetic waves, and the shielding material constitutes the backlight reflecting surface. By this constitution, the noise from the driving circuit can be prevented from affecting surrounding electronic instruments to improve EMI performance.

In the head-up display of the present invention, it is preferable that the image displaying light is projected from a liquid crystal display element, and that the display element has a transmission type monochromatic simple matrix liquid crystal display device whose liquid crystal action mode is the BTN mode, a backlight device capable of changing the light emission wavelength peak of the light which irradiates the liquid crystal display device, and a controller which synchronizes the image displaying timing on the liquid crystal display device and the light emission timing at the desired light emission wavelength peak in the backlight device.

According to this constitution, when a plurality of images constituting one information are repeatedly displayed on a time sharing basis by the liquid crystal display device, the displaying timing for each image and the light emission timing at the desired light emission wavelength peak in the backlight device can be synchronized. Therefore, the observer can realize the one information as a multiple-colored image without using a color filter. Also, because the liquid crystal action mode of the liquid crystal display device is the known BTN mode, quick image switching is possible without using a switching component, such as TFT. Therefore, a plurality of images can be displayed on a time sharing basis.

In the head-up display of the present invention, it is preferable that one of the housing and the combiner is provided with an insertion portion, that the other of the housing and the combiner is provided with a pit into which the insertion portion is extractably inserted, and that the combiner is supported by the housing via the insertion portion and the pit.

According to this constitution, the stress based on the bending moment etc. generated by the external force exerted on the combiner acts on the housing via the insertion portion and the pit. The stress is therefore dispersed over the entire contact range of the insertion portion and the pit. Therefore, the space inside the housing can be increased to facilitate parts arrangement in the housing, because it is unnecessary to thicken the housing to improve its strength. Also, the combiner can be separated from the housing by extracting the insertion portion from the pit, whereby cleaning and other maintenance work for the combiner are facilitated.

Preferably, the contact portions of the insertion portion and the pit are curved so that the normal direction of the optical path changing face of the combiner changes as the depth of insertion of the pit into the insertion portion changes. Alternatively, the outer face of the insertion portion and the inner face of the pit are formed along a cylindrical face so that the normal direction of the optical path changing face of the combiner changes as the insertion portion rotates relative to the pit.

By this constitution, the position of the combiner relative to the housing can be changed when the combiner is supported by the housing via the insertion portion and the pit.

Preferably, the insertion portion is capable of exerting an elastic force on the pit, and the position of the insertion portion relative to the pit can be retained by the frictional force generated by the elastic force. Alternatively, it is preferable that one of the insertion portion and the pit is provided with a plurality of grooves along the direction of insertion of the insertion portion into the pit, that a retention element having a projection, which can be fitted into each groove, is attachable to, and detachable from the other of the housing and the combiner, and that the projection is fitted into any one of the grooves to retain the position of the insertion portion relative to the pit.

By this constitution, the position of the virtual image, that is the subject of observation, can be finely adjusted because the position of the combiner relative to the housing can be finely adjusted.

BRIEF DESCRIPTION OF THE DRAWINGS

FIG. 2 (2) is a diagram for explanation of the head-up display not in use.

FIG. 5 (2) is a side view of the platy material and surplus element of the first embodiment of the present invention before separation.

FIG. 6 is a diagram for explanation of the dip coating process for the coating of the first embodiment of the present invention.

FIG. 7 is a diagram for explanation of the process for separation of the platy material and surplus element of the first embodiment of the present invention.

FIG. 22 (2) is an oblique view of the head-up display of the sixth embodiment of the present invention in housing.

DETAILED DESCRIPTION OF PREFERRED EMBODIMENTS

Embodiments of the present invention are hereinafter described with reference to the attached drawings.

Figure 1:
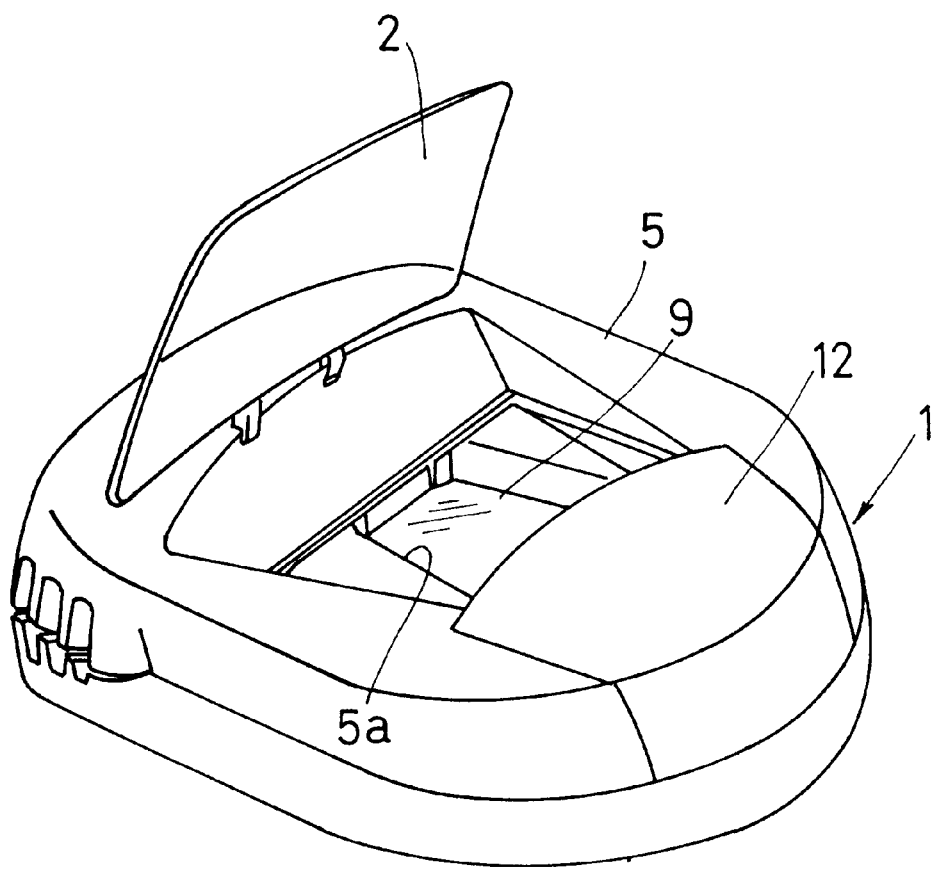
FIG. 1 is an oblique view of the head-up display of the first embodiment of the present invention.
Figure 2:
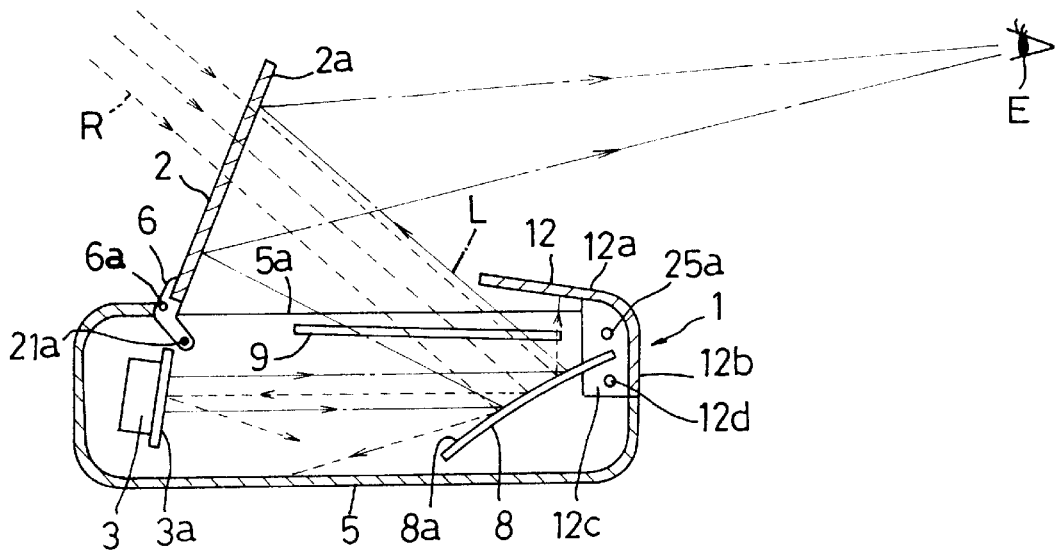
FIG. 2 (1) is a diagram for explanation of the head-up display of the first embodiment of the present invention in use.
Figure 2:
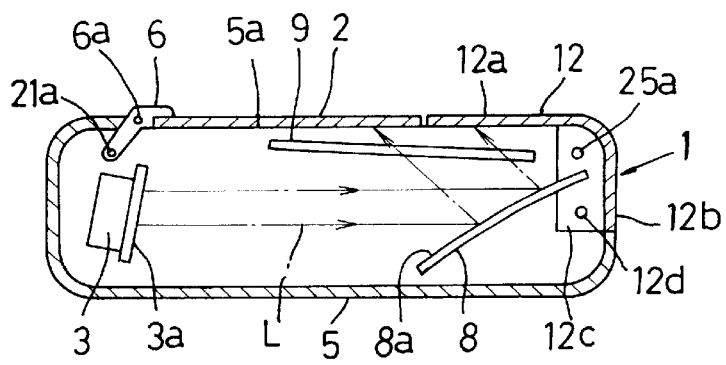

The head-up display 1 for cars illustrated in FIGS. 1, 2 (1) and 2 (2) comprises a combiner 2, a display element 3, a housing 5 which houses the display element 3 and has a beam outlet 5a having an upward opening, and a transparent cover 9 which covers the beam outlet 5a.

The combiner 2 is attached to the upper front side (left side in FIGS. 2 (1) and 2 (2)) of the housing 5 so that it is rotatable around the left-right axis 6a via a hinge 6. The housing 5 is attached to the upper face of a dash board or the like, whereby the combiner 2 and the display element 3 are arranged in front of the car driver (observer).

The combiner 2 is exemplified by a platy half mirror, hologram component, or the like. When a half mirror is used as the combiner 2, the optical path of incident light is changed by reflection; when a hologram component is used as the combiner 2, the optical path of incident light is changed by diffraction. The optical path changing face can be constituted by the front or back face of the combiner 2.

The display element 3 projects image displaying light L corresponding to navigation information or the like backwardly from the image displaying face 3a. The display element 3 is constituted of a liquid crystal display device having backlight device as a light source. In addition, fluorescent character display tube, LED, cathode ray tube etc., which do not need backlight device, can also constitute the display element 3.

A mirror (optical component) 8 having a reflecting surface (optical path changing face), which is oriented toward front side, is housed in the housing 5 below the transparent cover 9 so as to face the image displaying face 3a. The mirror 8 changes the optical path of the image displaying light L by total reflection. The reflecting surface 8a is convex to allow the divergence of incident light. Also, the reflecting surface 8a is inclined with respect to the vertical direction so that it goes backward as it ascends. By this constitution, the image displaying light L ascends as it goes forward from the beam outlet 5a as a result of the change of its optical path due to total reflection by the mirror 8, after which it is introduced into the combiner 2. The image displaying face 3a is inclined with respect to the vertical direction so that it departs from the mirror 8 as it descends.

The combiner 2 is capable of shifting between the use position shown in FIG. 2 (1) and the housing position shown in FIG. 2 (2) by rotating around the left-right axis 6a. The combiner 2 changes the optical path of the image displaying light L projected from the 10 beam outlet 5a to introduce the image displaying light L to the driver's pupil E at the use position, and closes the beam outlet 5a at the housing position.

By the change of the optical path of the image displaying light L by the combiner 2, a virtual image, that is a subject of observation, is formed in front of the combiner 2. Also, the light from the front passes through the combiner 2 and reaches the driver's pupil E. That is, the combiner 2 combines the image displaying light L and the light from the front. Therefore, both the virtual image and the actual article are visible by the driver. The shape of the optical path changing face 2a of the combiner 2 is preferably determined on the basis of the shape of the reflecting surface 8a of the mirror 8. That is, the optical path changing face 2a is preferably capable of forming a clear virtual image and converging the image displaying light L. For this reason, the optical path changing face 2a is preferably a curved face, such as a toric face or an off-axis rotationally symmetric aspherical face, which is capable of forming a virtual image, that is a subject of observation, farther in front thereof than in the case of simple reflection of the image displaying light by a flat face.

Between the combiner 2 and the driver, a mobile cover 12 is provided on the upper rear side of the housing 5. The mobile cover 12 has a platy upper portion 12a, a back portion 12b extending downwardly from the rear edge of the upper portion 12a, and a side portion 12c extending downwardly from the rear of the left and right side edges of the upper portion 12a. The mobile cover 12 is attached to the housing 5 via its side portion 12c so that it is rotatable around the left-right axis 12d. The mobile cover 12 shifts between the opening position shown in FIG. 2 (1) and the closing position shown in FIG. 2 (2) by rotating around the axis 12d. The mobile cover 12 does not shield the image displaying light L going toward the driver's pupil E at the opening position, but shields a portion of the image displaying light L going toward the driver's pupil E at the closing position.

Figure 3:
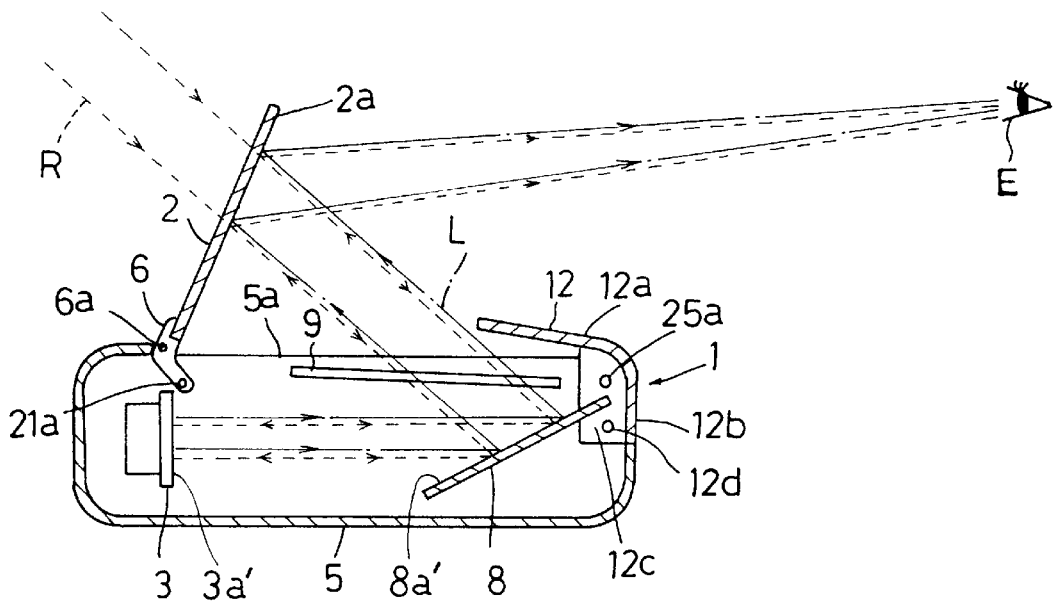
FIG. 3 shows the optical path of the image displaying light of the head-up display of a comparative example of the present invention.

FIG. 3 shows a comparative example. In this comparative example, the reflecting surface 8a of the mirror 8 is flat; the image displaying face 3a' is arranged along the vertical direction; the shape of the optical path changing face 2a of the combiner 2 is determined on the basis of the shape of the reflecting surface 8a of the mirror 8. The other aspects are the same as those in the above-described embodiment; the portions identical to those in the above-described embodiment are indicated by the same symbols.

According to the constitution of the above-described embodiment, the external light R, such as solar light, which passes through the combiner 2, is diverged by the reflecting surface 8a of the mirror 8, as shown by the dotted line in FIG. 2 (1). Therefore, the external light R does not focus in a narrow range. In contrast, if the reflecting surface 8a' is flat, as shown in the comparative example of FIG. 3, the external light R is not diverged by the reflecting surface 8a' but focuses at the image displaying face 3a'. That is, a portion of the external light R goes toward the image displaying face 3a' in the comparative example, while it goes to below the mobile cover 12 and the display element 3 in the embodiment. Therefore, in this embodiment, heat concentration in the image displaying face 3a by the infrared rays contained in the external light R can be mitigated, so that deterioration of the displaying performance of the display element 3 can be prevented.

Also, the reflecting surface 8a of the mirror 8 is arranged so as to be inclined with respect to the vertical direction to allow the image displaying light to ascend as the light goes forward, and the image displaying face 3a is arranged so as to be inclined with respect to the vertical direction to allow itself to depart from the mirror 8 as it descends. Therefore, even if the external light R, which passes through the combiner 2, reaches the image displaying face 3a, the external light R is introduced to below the mirror 8 by being reflected by the image displaying face 3a. Therefore, the external light R does not go toward the driver's pupil E, so that deterioration of visibility by the external light R can be prevented. In contrast, in the comparative example of FIG. 3, because the image displaying face 3a' is arranged along the vertical direction, the external light R, which passes through the combiner 2, reaches the driver's pupil E together with the image displaying light L by being reflected by the image displaying face 3a.

In the above-described embodiment, the reflecting surface 8a of the mirror 8 is arranged not to be perpendicular to the incidence direction of the external light R which passes through the combiner 2. Therefore, the external light R which passes through the combiner 2 never goes toward the combiner 2 again, whereby the external light R can be prevented from reaching the driver's pupil E.

In the above-described embodiment, the optical path "a" of the image displaying light L, which is projected from any one point of the display element 3, from the mirror 8 to the combiner 2 is located above the optical path "b" of the image displaying light L from the projection point to the mirror 8 and also below the optical path "c" of the image displaying light L from the combiner 2 to the driver's pupil E. By this constitution, the display element 3 can be placed as close to the combiner 2 as possible. Therefore, the head-up display 1 can be made more compact, so that the it is suited for installation in the narrow space inside a car compartment.

Figure 4:
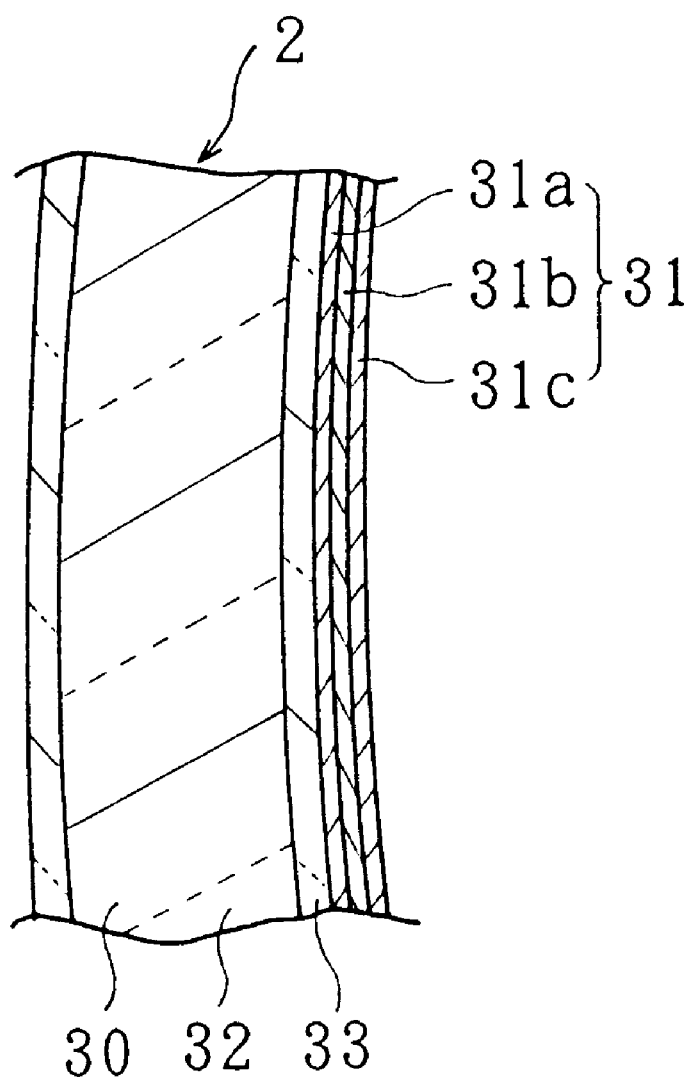
FIG. 4 is a cross-sectional view for explanation of the constitution of the combiner of the first embodiment of the present invention.

As illustrated in FIG. 4, the combiner 2 comprises a body 30 and a reflecting layer 31 which covers one face of the body 30. The body 30 is configured with a synthetic resin platy material 32 and a coating 33 which covers the platy material 32. The coating 33 is harder and smaller in thermal expansion coefficient than the platy material 32. The reflecting layer 31 is formed on the coating 33. The body 30 can be configured with a plurality of synthetic resin platy materials which are glued to each other so as to be stacked.

The reflecting layer 31 is configured with a plurality of laminated films 31a, 31b and 31c. The films 31a, 31b and 31c differ from each other in refractive index. The films 31a, 31b and 31c are smaller in thermal expansion coefficient than the platy material 32. Each of the films 31a, 31b and 31c has residual compressive stress at normal temperature.

Figure 5:
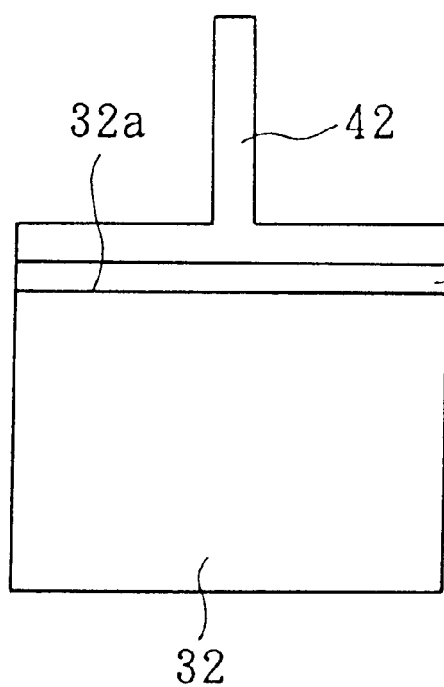
FIG. 5 (1) is a front view of the platy material and surplus element of the first embodiment of the present invention before separation.
Figure 5:
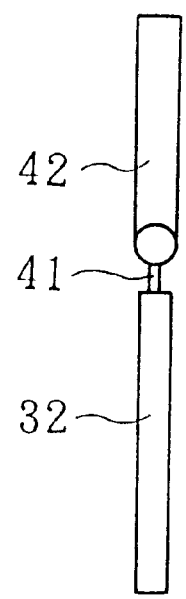

To produce the combiner 2, the synthetic resin platy material 31 of the body 30 is first prepared by injection molding. The platy material 32 is exemplified by polycarbonate and acrylic resin. The mold used for the injection molding comprises a flash gate as wide as one side of the peripheral margin of the platy material 32. For the injection molding, the synthetic resin material in a molten state is injected from a known injecting device to a cavity via a spool, a runner and the flash gate. Surplus elements solidified at the runner and the flash gate is unified to the platy material 32 solidified in the cavity. For example, as illustrated in FIGS. 5 (1) and 5 (2), a surplus element 41 consisting of the synthetic resin solidified at the flash gate and another surplus element 42 consisting of the synthetic resin solidified at the runner are unified into the platy material 32 taken out from the mold. Because the size of the flash gate is roughly equal to the size of one side of the peripheral margin of the platy material 32, the surplus element 41 at the flash gate occupies the entire portion of the one side of the peripheral margin of the platy material 32.

Before the surplus elements 41 and 42 are separated from the platy material 32, the above-described coating 33 which covers the platy material 32 is formed. As illustrated in FIG. 6, the coating 33 is formed by dip coating. In this operation, one side 32a of the peripheral margin of the platy material 32 communicating to the surplus element 41 serves as the upper end side. The dip coating material 35 for the coating 33 is a solution of a hard coating material, such as that based on silicone monoxide (SiO) or silicone dioxide ($SiO_2$).

After the coating 33 is formed, the surplus elements 41 and 42 are separated from the platy material 32, as illustrated in FIG. 7.

Next, a reflecting layer 31 consisting of the above-described plurality of films 31a, 31b and 31c is formed on the coating 33. Each of the films 31a, 31b and 31c can be laminated while the platy material 32 covered with the coating 33 is thermally expanded in a vacuum oven at 100 to 150° C. Each of the films 31a, 31b and 31c can be formed by, for example, vacuum depositing an oxide of zinc (Zr), titanium (Ti) or silicone (Si). By controlling the thickness of each of the films 31a, 31b and 31c at light wavelength level, the desired reflectance can be achieved. Because the thermal expansion coefficient of each of the films 31a, 31b and 31c is smaller than that of the platy material 32, shrinkage of the platy material 32 upon temperature reduction to normal temperature can be prevented by means of the reflecting layer 31. Therefore, compressive stress remains in each of the films 31a, 31b and 31c at normal temperature.

By covering the synthetic resin platy material 32 constituting the body 30 by a coating 33 which is harder and smaller in thermal expansion coefficient than the platy material 32, deterioration of the combiner 2 due to swelling and solar light exposure can be prevented.

Because the reflecting layer 31, which is configured with a plurality of films, is formed on the coating 33, the reflecting layer 31 can be prevented from cracking and peeling from the body 30, whereby a combiner 2 of high reflectance and high transparency can be obtained. Moreover, because the films 31a, 31b and 31c constituting the reflecting layer 31 have residual compressive stress at normal temperature, internal tensile stress can be prevented from being exerted on the reflecting layer 31, even in the case of expansion of the body 30, whereby peeling and cracking of the reflecting layer 31 can be prevented.

The coating 33 can easily be formed by dip coating. In the dip coating operation, because the surplus element 41 solidified at the flash gate communicates to the upper end of the platy material 32, the dip coating material 35 can be prevented from being localized in the upper end of the platy material 32, whereby the liquid run of the dip coating material 35 can be uniformized. The thickness of the coating 33 can therefore be uniformized to prevent the displayed virtual image from becoming unclear. The silicone monoxide (SiO) contained in the dip coating material 35 functions as a surfactant when a plurality of films are formed by an oxide on the surface of the coating 33, whereby the plurality of films can be strongly joined onto the coating 33.

The present invention is not limited to the above-described embodiment. For example, in the above-described embodiment, a total reflection mirror having a convex reflecting surface which diverges incident light is used as an optical component, the mirror can be replaced with an optical component which changes the optical path of the image displaying light by diffraction and diverges incident light. The head-up display according to the present invention can be installed on vehicles other than cars. The contents of the image presented on the head-up display according to the present invention is not limited to navigation information.

Figure 8:
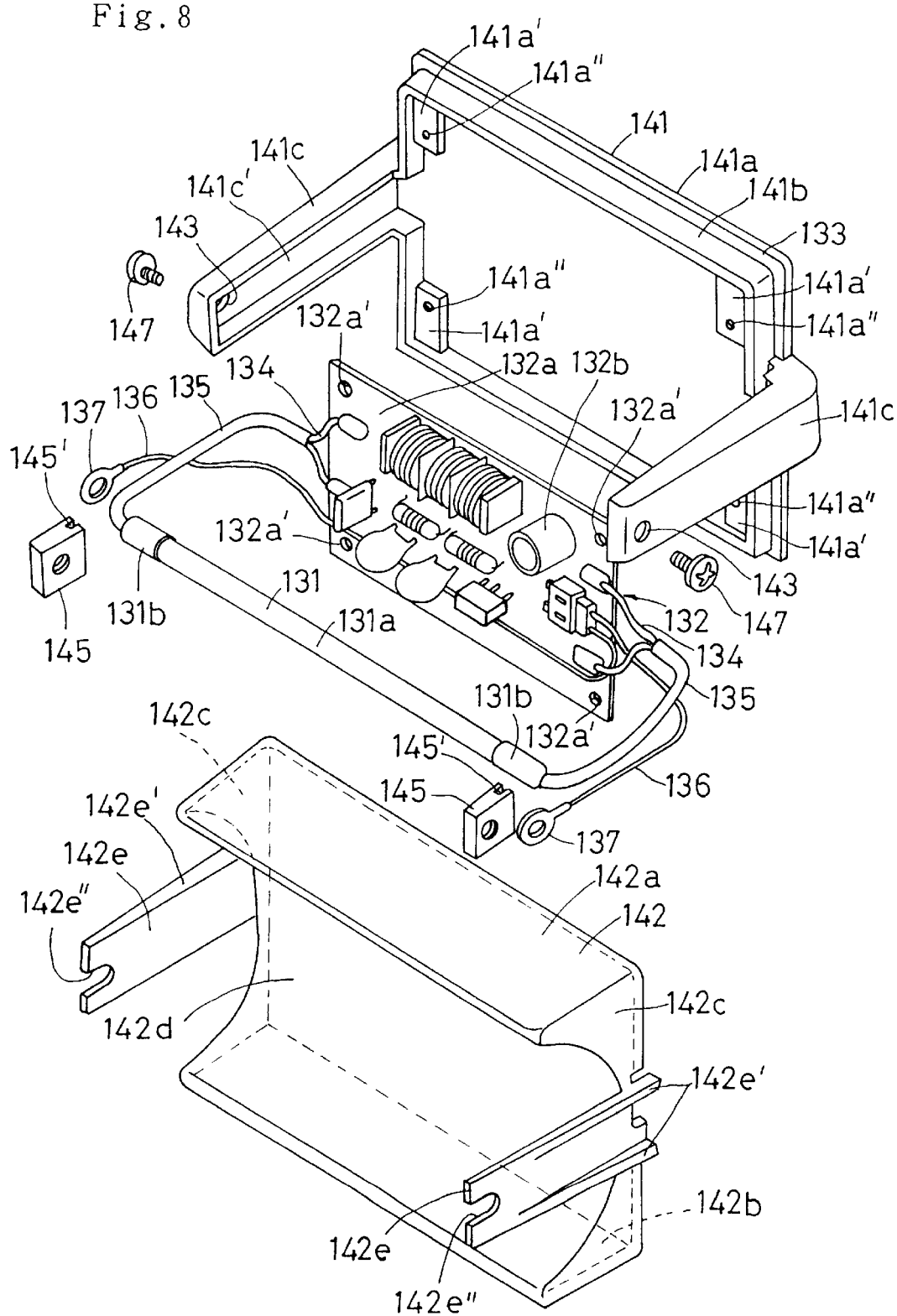
FIG. 8 is an exploded oblique view of the light source for backlight of the first embodiment of the present invention.
Figure 9:
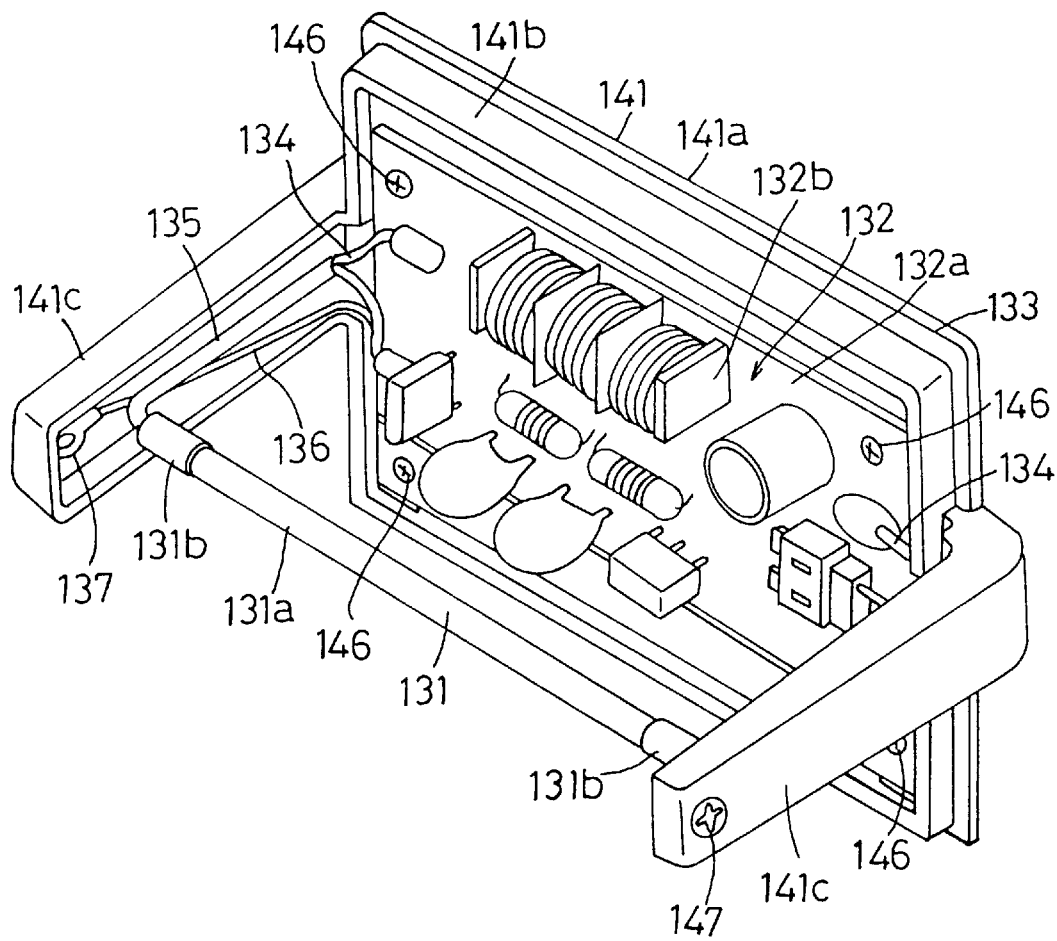
FIGS. 9 (1) and 9 (2) are diagrams for explanation of the method of assembling the light source for backlight of the first embodiment of the present invention.
Figure 9:
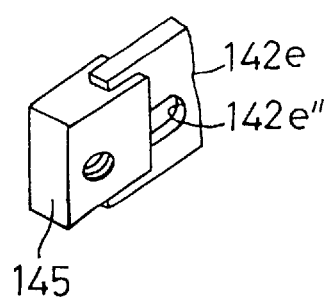
Figure 10:
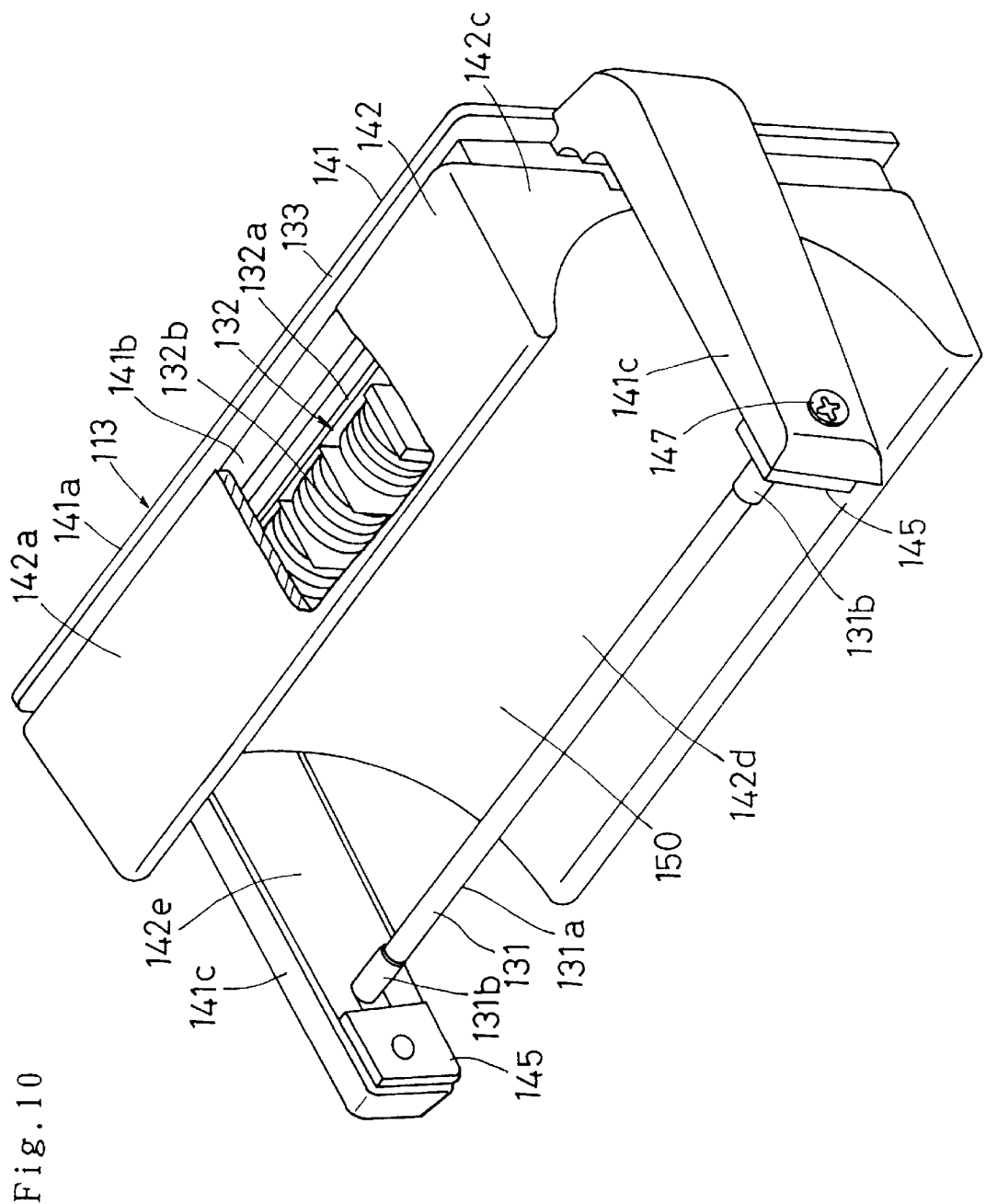
FIG. 10 is an oblique view of the light source for backlight of the first embodiment of the present invention.

When a liquid crystal display element having backlight device is used as the above-described display element 3, the light source 113 for backlight illustrated in FIGS. 8, 9 (1), 9 (2) and (10) can be used. The light source 113 comprises a rod-like fluorescent tube 131, which serves as a main structure of the light source, a driving portion 132 for the fluorescent tube 131, and a support portion 133 for the fluorescent tube 131 and the driving portion 132.

The fluorescent tube 131 has a bulb 131a and a power receiving socket 131b attachable to, and detachable from the bulb 131a.

The driving portion 132 has a rectangular substrate 132a and a driving circuit 132b configured with a set of components mounted on the substrate 132a. In this embodiment, the driving circuit 132b constitutes an invertor and a light control circuit. When backlight intensity does not need to be controlled, an invertor alone is sufficient. The two ends of the fluorescent tube 131 and the driving circuit 132b are connected to each other by leads 134. The leads 134 are covered with a protecting tube 135. A ring-shaped power-receiving terminals 137 are provided to the tips of a pair of leads 136 extending from the driving circuit 132b.

The support portion 133 is joined to the housing 5 by, for example, a screw, whereby the light source 133 for backlight is attachable to, and detachable from the housing 5.

The support portion 133 has a first member 141 and a second member 142, both made of synthetic resin. The first member 141 has a rectangular platy support wall 141a, a peripheral wall protruding from the support wall 141a, and a pair of arm covers 141c protruding from the two sides of the support wall 141a. In the support wall 141a, receiving portions 141a' are formed at the four corners of the peripheral wall 141b. Each of the two arm covers 141c has a pit 141c'.

The substrate 132a is supported by the receiving portions 141a'. The substrate 132a is fixed to the first member 141 by screwing screws 146 inserted into the screw hole 132a' of the substrate 132a into female screw holes 141a' formed in the receiving portions 141a'. The leads 134 and 136 and the power-receiving terminals 137 are arranged in the pits 141c' of the arm covers 141c.

The second member 142 has a rectangular platy upper wall 142a, a rectangular platy lower wall 142b, both side walls 142c, a main wall 142d, and a pair of arms 142e protruding from the side walls 142c. The portion surrounded by the walls 142a, 142b, 142c and 142d is a hollow space.

The surface of the main wall 142d serves as a concave backlight reflecting surface 150. By the backlight reflecting surface 150, the backlight beam generated by the fluorescent tube 131 is reflected. The backlight beam thus reflected goes toward the liquid crystal display panel which constitutes the display element 3.

Each of the arms 142e has an outwardly protruding fitting portion 142e' and a notch 142e".

The inner periphery of the upper and lower walls 142a and 142b and both side walls 142c of the second member 142 are fitted into the outer periphery of the peripheral wall 141b of the first member 141, whereby the space inside the support portion 133 is formed so that it is covered by the first member 141 and the second member 142. In the space inside the support portion 133, the above-described driving circuit 132b is arranged.

The outer periphery of each of the arms 142e is fitted into the opening of the pit 141c' of each of the arm covers 141c, whereby the space inside the support portion 133 is formed so that it is covered by the arm 142e and the arm cover 141c. In the space inside the support portion 133, the above-described leads 134 and 136 and power receiving terminal 137 are arranged.

Into the notch 142e" at the tip of each of the arms 142e, each of the sockets 131b at both ends of the fluorescent tube 131 is inserted, whereby the fluorescent tube 131 is arranged in a space outside the support portion 133. As illustrated in FIGS. 8 and 9 (2), the opening of each of the notches 142e" is closed by a nut 145 fitted into each of the arms 142e via a groove 145'. To each of the nuts 145, a screw 47 of electroconductive material is screwed. Each of the screws 47 is inserted into a hole 43 formed in each of the arm covers 141c and each of the ring-shaped power receiving terminals 137, whereby the first member 141 and the second member 142 are joined to each other. Also, the fluorescent tube 131 is supported at both ends by the two arms 142e. To the screws 47, power supply cables (not illustrated) are connected.

The outer face of the support portion 133 is coated with a shielding material. The coating can be achieved by vapor deposition or the like. The shielding material is exemplified by aluminum or the like which is capable of shielding electromagnetic waves and has high reflectance. Using the shielding material, the influence of the noise, which is generated by the invertor constituting the driving circuit 132b, on surrounding electronic instruments can be decreased. Also, the shielding material constitutes the above-described backlight reflecting surface 150. When an electroconductive material of high light reflectance is used as the shielding material, noise can be shielded by electrostatic shielding. When a magnetic material of high light reflectance and high magnetic permeability is used as the shielding material, noise can be shielded by electromagnetic shielding. The entire support portion 133 can be configured with a shielding material.

The above-described light source 133 for backlight is a unit attachable to, and detachable from the housing 5. Replacement of the bulb 131a of a damaged or expiring fluorescent tube 131 is therefore facilitated by removing the unit from the housing 5.

Because the above-described driving circuit 132b and leads 134 are arranged in the space inside the support portion 133, they are shielded against water droplets, foreign substances, etc., and prevented from damaging.

Because the fluorescent tube 131 is supported by the support portion 133 and the outer surface of the support portion 133 constitutes the backlight reflecting surface 150, the driving circuit 132b can be placed as close to the fluorescent tube 131 as possible. Therefore, the light source 113 for backlight can be made more compact. Also, because the leads 134, which connect the driving circuit 132b to the fluorescent tube 131, can be shortened, startability reduction can be prevented.

Furthermore, because the backlight reflecting surface 150 is configured with a shielding material capable of shielding electromagnetic waves, the noise from the driving circuit 132b can be prevented from affecting surrounding electronic instruments to improve EMI performance.

Figure 11:
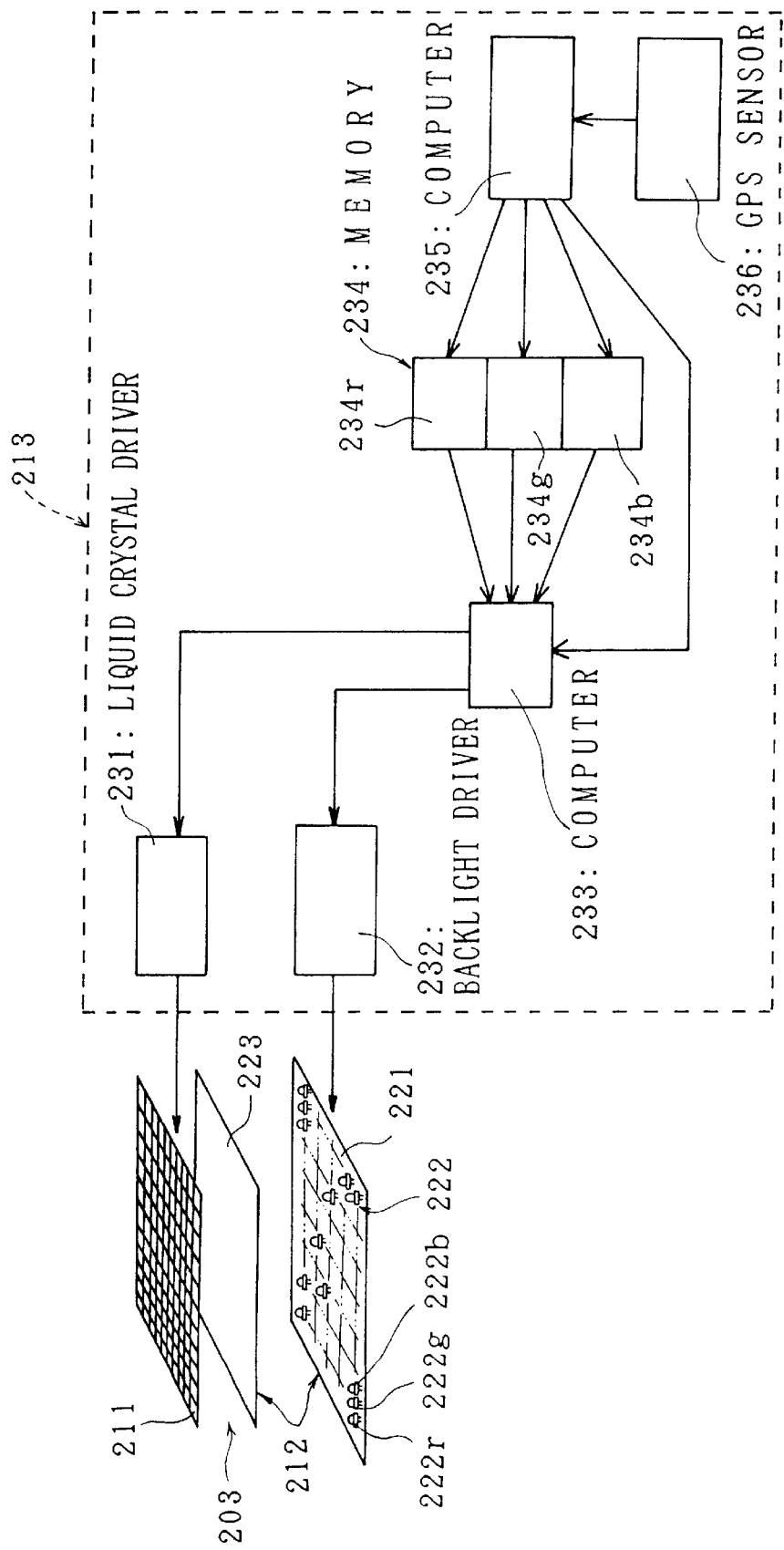
FIG. 11 is a diagram for explanation of the important portion of the display element of a modification of the present invention.
Figure 12:
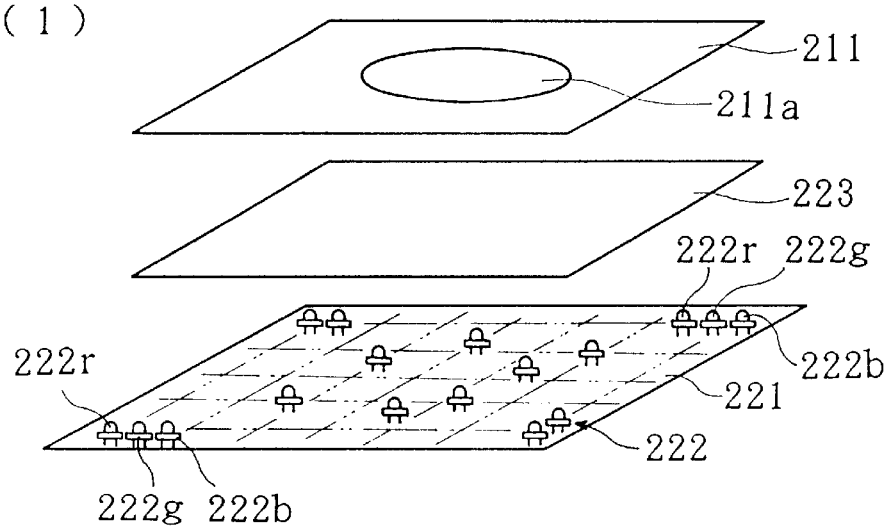
FIGS. 12 (1), 12 (2) and 12 (3) are diagrams for explanation of the action of the display element of a modification of the present invention.
Figure 12:
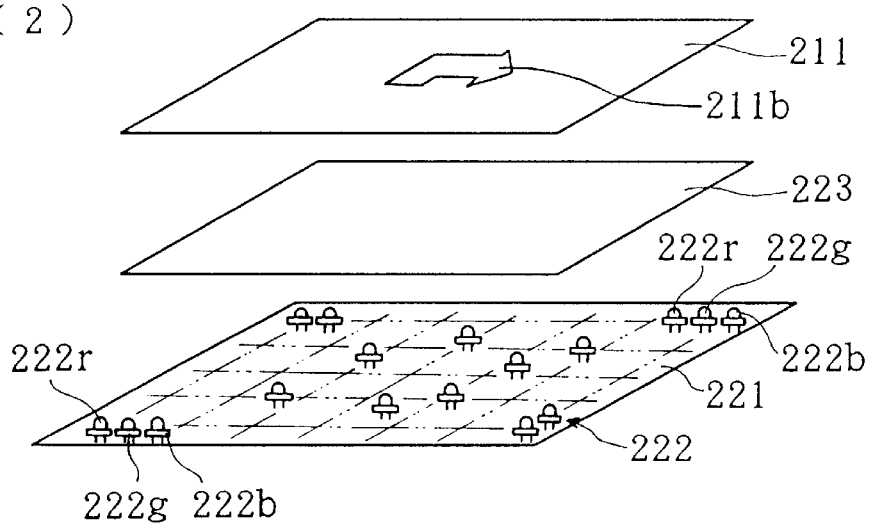
Figure 12:
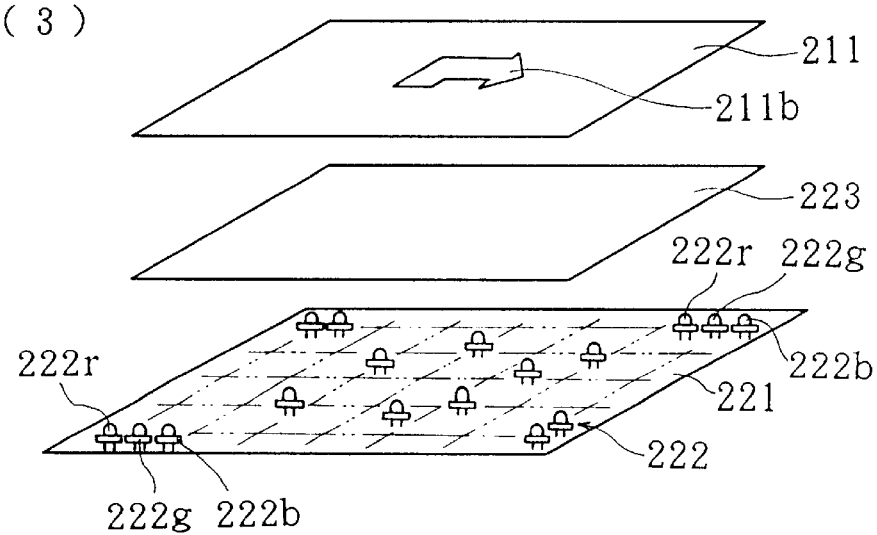

In place of the above-described display element 3, the liquid crystal display element 203 illustrated in FIGS. 11, 12 (1), 12 (2), 12 (3) and 13 can be used.

As illustrated in FIG. 11, the display element 203 has a transmission type monochromatic simple matrix liquid crystal display device 211, a backlight device 212 capable of changing the wavelength of the light irradiating the liquid crystal display device 211, and a controller 213 for controlling the liquid crystal display device 211 and the backlight device 212.

The liquid crystal action mode of the liquid crystal display device 211 is the known BTN mode, in which the condition of each picture element is switched between light transmission and nontransmission by directly driving the liquid crystal of each picture element from each scanning electrode, on the basis of the fact that the liquid crystal molecules retains a particular arrangement for several seconds at two torsion angles.

The backlight device 212 has an LED array 222 formed on a substrate 221 as a light source, and a scattering plate 223. The scattering plate 223 scatters the light beam from the LED array 222 to uniformly irradiate it over the entire image displaying face of the liquid crystal display device 211. The LED array 222 is configured with three kinds of LED 222r, 222g and 222b of mutually different light emission wavelength peaks. The three kinds of LED 222r, 222g and 222b are uniformly distributed on the substrate 221. The colors corresponding to the light emission wavelength peaks of the three kinds of LED 222r, 222g and 222b are the three primaries, that is, red, green and blue.

The controller 213 is capable of synchronizing the image displaying timing on the liquid crystal display device 211 and the light emission timing at the desired light emission wavelength peak in the backlight device 212. The controller 213 has a liquid crystal driver 231, a backlight driver 232, a computer 233 for controlling the two drivers 231 and 232, a memory 234 connected to the driver controlling the computer 233, a computer 235 for determining navigation information connected to the computer 233 and memory 234, and a GPS sensor 236 connected to the computer 235.

The GPS sensor 236 transmits a signal from an artificial satellite constituting the global positioning system (GPS) to the computer 235.

The computer 235 determines red image data, green image data and blue image data to constitute the navigation information on the basis of the signal from the artificial satellite and memorized program. Also, the computer 235 memorizes the image data in the memory 234. Furthermore, the computer 235 generates an image displaying instruction signal on the basis of the order of output of the image data, displaying time, etc. The image displaying instruction signal is transmitted to the driver controlling computer 233.

The memory 234 has a red image data storing region 234r, a green image data storing region 234g, and a blue image data storing region 234b.

The driver controlling computer 233 reads the image data from the data storing regions 234r, 234g and 234b of the memory 234 on the basis of the image displaying instruction signal. Also, the computer 233 transmits one control signal corresponding to the shape of the image specified by the read image data to the liquid crystal driver 231. Moreover, the computer 233 transmits another control signal corresponding to the color of the image specified by the read image data to the backlight driver 232 in synchronization with the one control signal.

The liquid crystal driver 231 transmits a liquid crystal driving signal to drive each picture element of the liquid crystal display device 211.

The backlight driver 232 transmits a light emission signal to drive the LED 222r, 222g and 222b to the backlight device 212.

FIGS. 12 (1), 12 (2), 12 (3) and 13 show example of a right-turn image displayed according to the above-described constitution. The displaying steps are as follows.

First, the computer 235 determines to display the right-turn image as the navigation information on the basis of the signal from the GPS sensor 236. Upon this determination, image data corresponding to a circular region of the right-turn image is memorized in the red image data storing region 234r of the memory 234, and image data corresponding to a right-turn indication arrow of the right-turn image is memorized in the green image data storing region 234g and the blue image data storing region 234b.

The computer 235 determines to display the circular region corresponding to the red image data for a preset period of time at first, to display the right-turn indication arrow for a period of time which is twice the circular region displaying time in the next place, and to repeat this procedure in cycles. The computer 235 thereafter transmits an image displaying instruction signal corresponding to this determination to the driver controlling computer 233.

The driver controlling computer 233 reads the image data corresponding to the shape of the circular image from the red image data storing region 234r of the memory 234 on the basis of the image displaying instruction signal. It then transmits a control signal corresponding to the shape of the circular image to the liquid crystal driver 231, and at the same time transmits a control signal corresponding to red color to the backlight driver 232.

The liquid crystal driver 231 transmits a driving signal to the liquid crystal display device 211 on the basis of the control signal to allow a circular image to be displayed.

Thereby, as illustrated in FIG. 12 (1), the picture elements constituting the circular image 211a become transmission condition, while the other picture elements become non-transmission condition, on the liquid crystal display device 211. At the same time, the backlight driver 232 transmits a driving signal for light emission of the LED 222r, which has a light emission wavelength peak corresponding to red color, to the backlight device 212. Thereby, the LED 222r, which has a light emission wavelength peak corresponding to red color, is turned on at the backlight device 212 in synchronization with the timing of displaying of the circular image on the liquid crystal display device 211, while the LED 222g and 222b, which have light emission wavelength peaks corresponding to green and blue colors, are turned off.

Next, the driver controlling computer 233 reads the image data from the blue image data storing region 234b of the memory 234 on the basis of the image displaying instruction signal. It then transmits a control signal corresponding to the shape of the right-turn indication arrow image to the liquid crystal driver 231, and at the same time transmits a control signal corresponding to blue color to the backlight driver 232.

The liquid crystal driver 231 transmits a driving signal to the liquid crystal display element 211 on the basis of the control signal to allow the right-turn indication arrow image to be displayed. Thereby, as illustrated in FIG. 12 (2), the picture elements constituting the right-turn indication arrow image 211b become transmission condition, while the other picture elements become nontransmission condition, on the liquid crystal display device 211. At the same time, the backlight driver 232 transmits a driving signal for light emission of the LED 222b, which has a light emission wavelength peak corresponding to blue color, to the backlight device 212. Thereby, the LED 222b, which has a light emission wavelength peak corresponding to blue color, is turned on at the backlight device 212 in synchronization with the timing of displaying of the right-turn indication arrow image on the liquid crystal display device 211, while the LED 222r and 222g, which have light emission wavelength peaks corresponding to red and green colors, are turned off.

Next, the driver controlling computer 233 reads the image data from the green image data storing region 234g of the memory 234 on the basis of the image displaying instruction signal. It then transmits a control signal corresponding to the shape of the right-turn indication image to the liquid crystal driver 231, and at the same time transmits a control signal corresponding to green color to the backlight driver 232.

The liquid crystal driver 231 transmits a driving signal to the liquid crystal display element 211 on the basis of the control signal to allow the right-turn indication arrow image to be displayed. Thereby, as illustrated in FIG. 12 (3), the picture elements constituting the right-turn indication arrow image 211b become transmission condition, while the other picture elements become nontransmission condition, on the liquid crystal display device 211. At the same time, the backlight driver 232 transmits a driving signal for light emission of the LED 222g, which has a light emission wavelength peak corresponding to green color, to the backlight device 212. Thereby, the LED 222g, which has a light emission wavelength peak corresponding to green color, is turned on in synchronization with the timing of displaying of the right-turn indication arrow image on the liquid crystal display device 211, while the LED 222r and 222b, which have light emission wavelength peaks corresponding to red and blue colors, are turned off.

Figure 13:
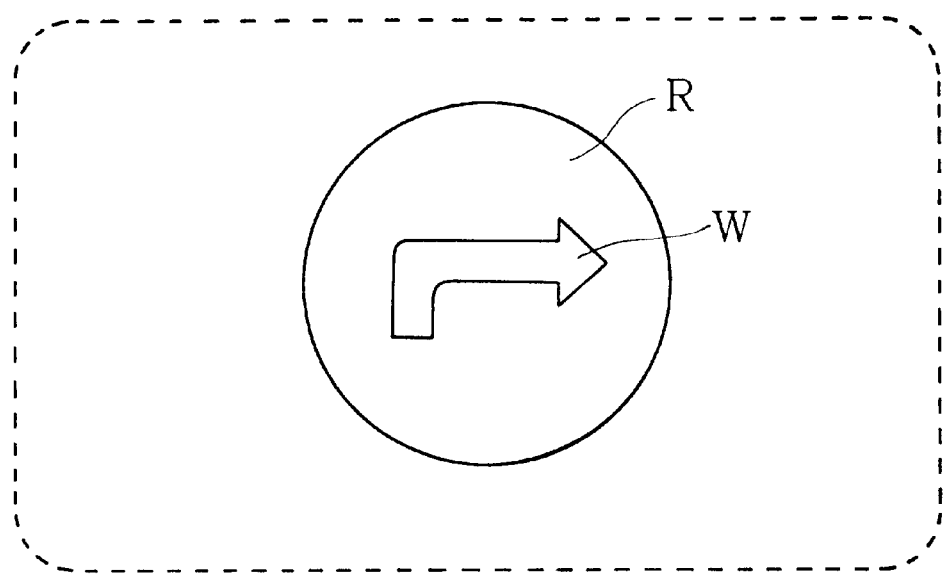
FIG. 13 shows an example image presentation by the display element of a modification of the present invention.

The plurality of images shown in FIGS. 12 (1), 12 (2) and 12 (3) are repeatedly displayed on a time sharing basis. The timing of displaying of each image and the timing of light emission of each LED having light emission wavelength peak corresponding to the color of each image are synchronized, whereby the driver can visually recognize the red circular image R and the white right-turn indication arrow image W in the circular image R, as illustrated in FIG. 13.

According to the above-described constitution, when a plurality of images 211a and 211b constituting one information are repeatedly displayed by the liquid crystal display device 211 on a time sharing basis, the timing of displaying of each of the displayed images 211a and 211b and the timing of light emission at the desired light emission wavelength peak in the backlight device 212 are synchronized, whereby the driver can recognize the information as the multiple-colored image R, W without using a color filter. Also, because the liquid crystal action mode of the liquid crystal display element 211 is the BTN mode, image switching can be achieved at high speeds without using a switching component, such as TFT, whereby a plurality of images can be displayed on a time sharing basis.

Figure 14:
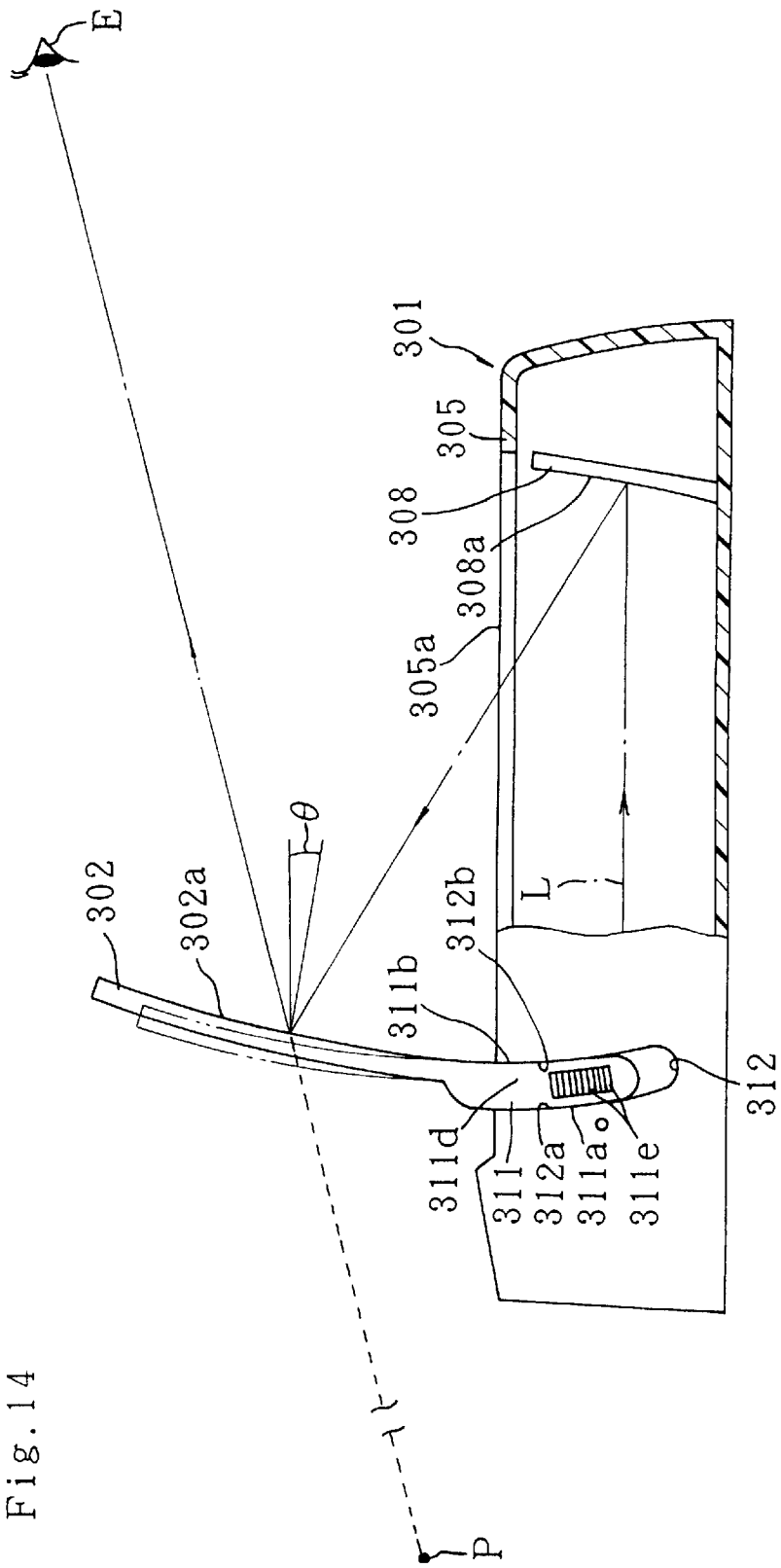
FIG. 14 is a partially cut side view for explanation of the constitution of the head-up display of the second embodiment of the present invention.
Figure 15:
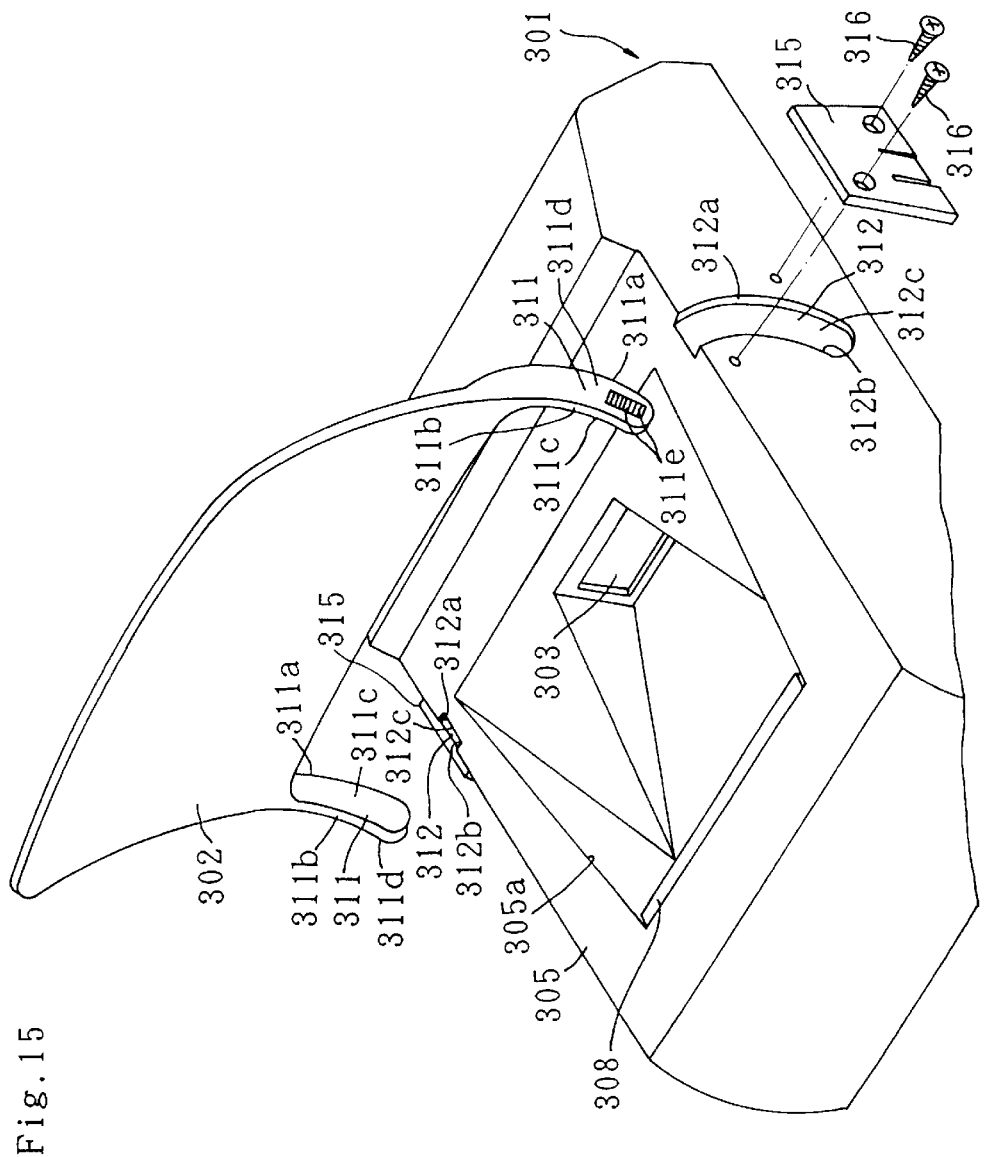
FIG. 15 is an oblique view of the head-up display of the second embodiment of the present invention.
Figure 16:
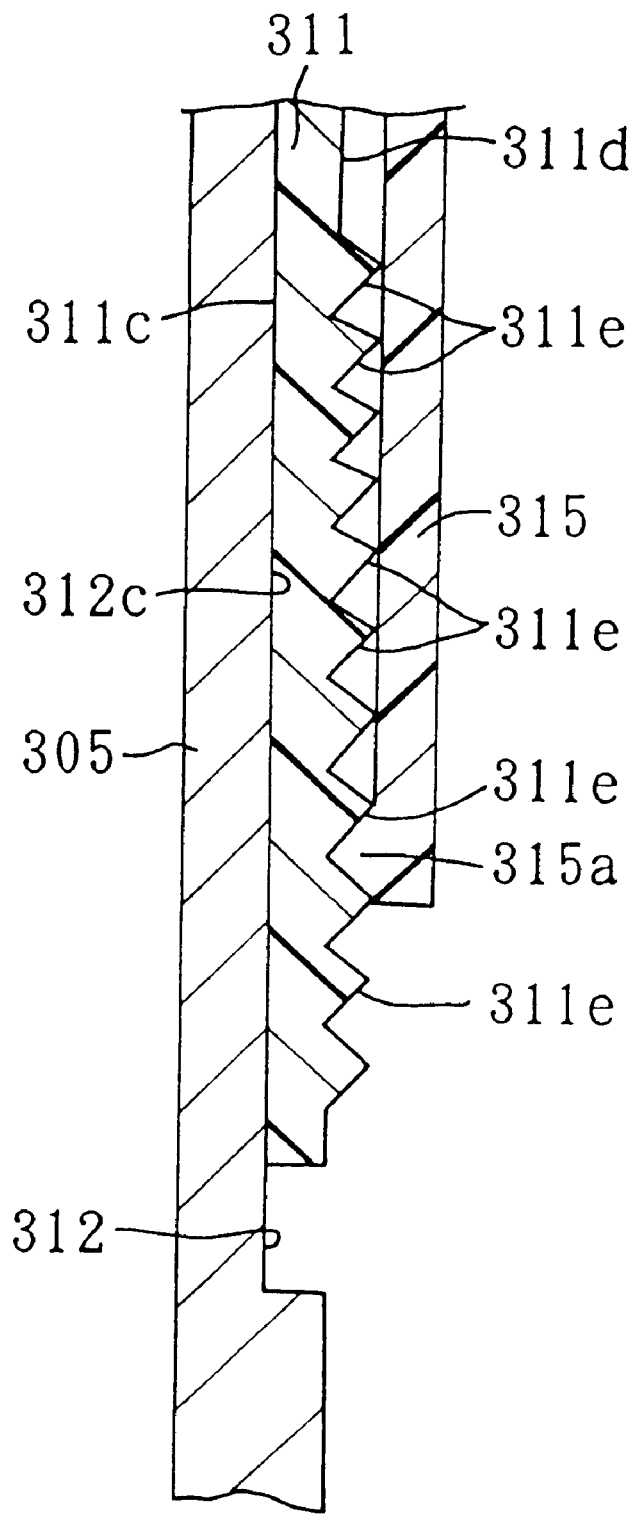
FIG. 16 is a partial cross-sectional view of the head-up display of the second embodiment of the present invention.

FIGS. 14 through 16 illustrate the head-up display 301 of the second embodiment of the present invention. This embodiment differs from the above-described first embodiment in that there is no mobile cover 312, and that a pair of downwardly protruding insertion portions 311 are provided in the combiner 302. On both sides of the housing 305, a pair of pits 312 are provided so that their upper ends and sides are open. One insertion portion 311 is inserted into one pit 312, and the other insertion portion 311 is inserted into the other pit 312. The front portion 311a of each insertion portion 311 is in contact with the front portion 312a of the pit 312; the rear portion 311b of each insertion portion 311 is in contact with the rear portion 312b of the pit 312; one side portion 311c of each insertion portion 311 is in contact with the inside portion 312c of the pit 312. By this constitution, the combiner 302 is supported by the housing 305 via the outer face of the insertion portion 311 and the inner face of the pit 312.

The front and rear portions 311a and 311b of each insertion portion 311 and also the front and rear portions 312a and 312b of each pit 312 are curved along an arch, which is convex to the front. The arch, along which the front portion 311a of each insertion portion 311 and the front portion 312a of each pit 312 are placed, and the arch, along which the rear portion 311b of each insertion portion 311 and the rear portion 312b of each pit 312 are placed, are mutually concentric. Therefore, the normal direction of the optical path changing face 302a of the combiner 302 changes as the depth of insertion of each insertion portion 311 into each pit 312 changes. For example, as the depth of insertion increases, the combiner 302 changes its condition from that indicated by the solid line to that indicated by the two-dot chain line in FIG. 14. By this change, the angle of the normal direction of the optical path changing face 302a relative to the front-rear direction changes by θ in FIG. 14.

In the other side portion 311d of each insertion portion 311, a plurality of mutually parallel grooves 311e are provided. The grooves 311e are arranged along the direction of insertion of the insertion portion 311 into the pit 312. Retention element 315 are attached on both sides of the housing 305 with a screw 16 so as to be attachable to, and detachable from the housing 305. As illustrated in FIG. 16, one projection 315a, which can be fitted into each groove 311e, is formed in each retention element 315. As the projection 315a is fitted into any groove 311e, the position of the insertion portion 311 relative to the pit 312 is retained. The other aspects are the same as those in the first embodiment.

According to the above-described second embodiment, the stress based on bending moment etc. generated by the external force exerted on the combiner 302 acts on the housing 305 via the insertion portion 311 and the pit 312. The stress is therefore dispersed over the entire contact range of the insertion portion 311 and the pit 312. Therefore, the space inside the housing 305 can be increased to facilitate parts arrangement in the housing 305, because it is unnecessary to thicken the housing 305 to improve its strength.

Also, the combiner 302 can be separated from the housing 305 by extracting the insertion portion 311 from the pit 312 after the retention element 315 is removed from the housing 305, whereby cleaning and other maintenance work for the combiner 302 are facilitated.

In addition, the position of the combiner 302 relative to the housing 305 can be changed by changing the depth of insertion of the insertion portion 311 into the pit 312, whereby the position of the virtual image, that is the subject of observation, can be changed. In this operation, by changing the position of the groove 311e, into which the projection 315a of the retention element 315 is fitted, the position of the insertion portion 311 relative to the pit 312 can be retained. Therefore, the position of the virtual image, that is the subject of observation, can be finely adjusted, because the position of the combiner 302 relative to the housing 305 can be finely adjusted.

Figure 17:
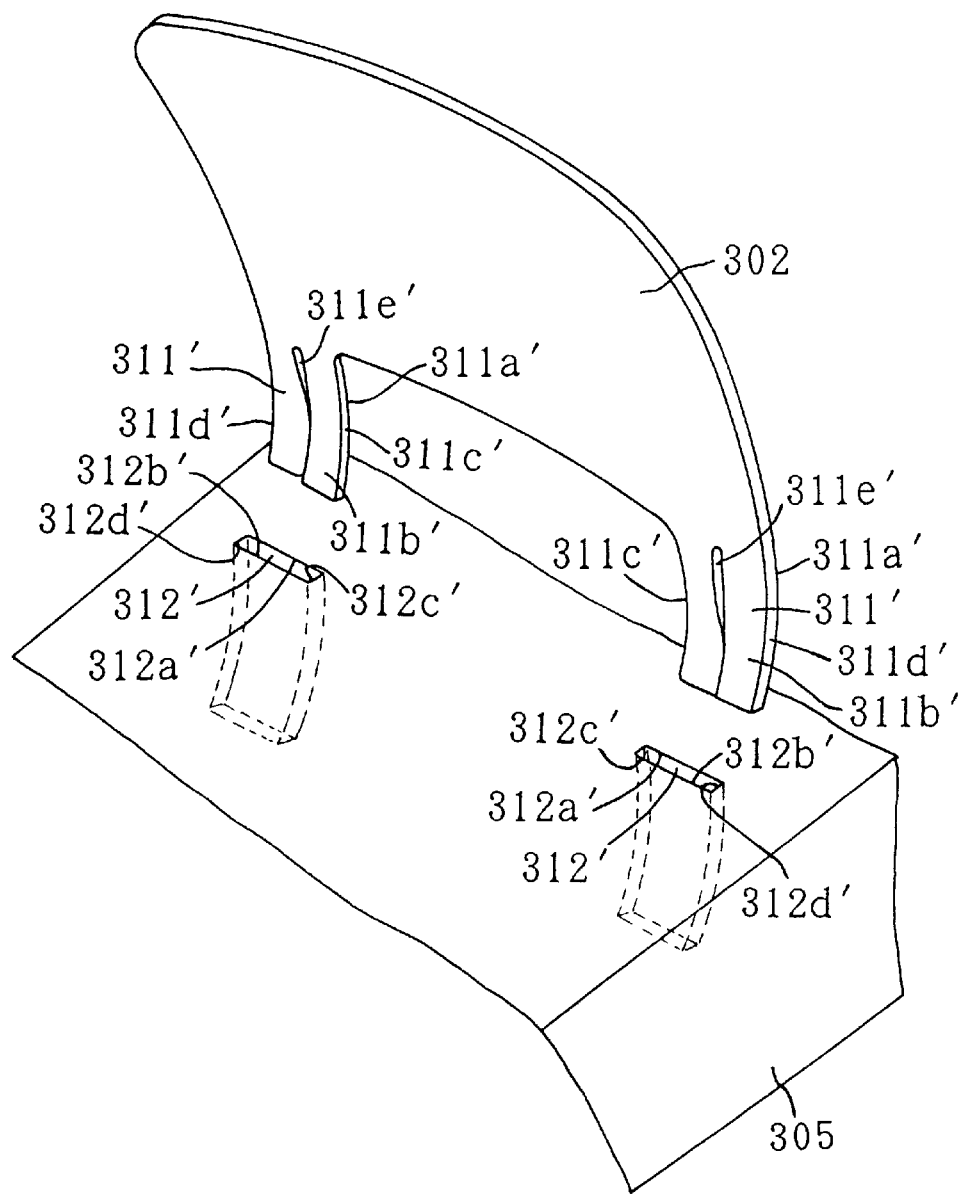
FIG. 17 is a partial oblique view of the head-up display of the third embodiment of the present invention.
Figure 18:
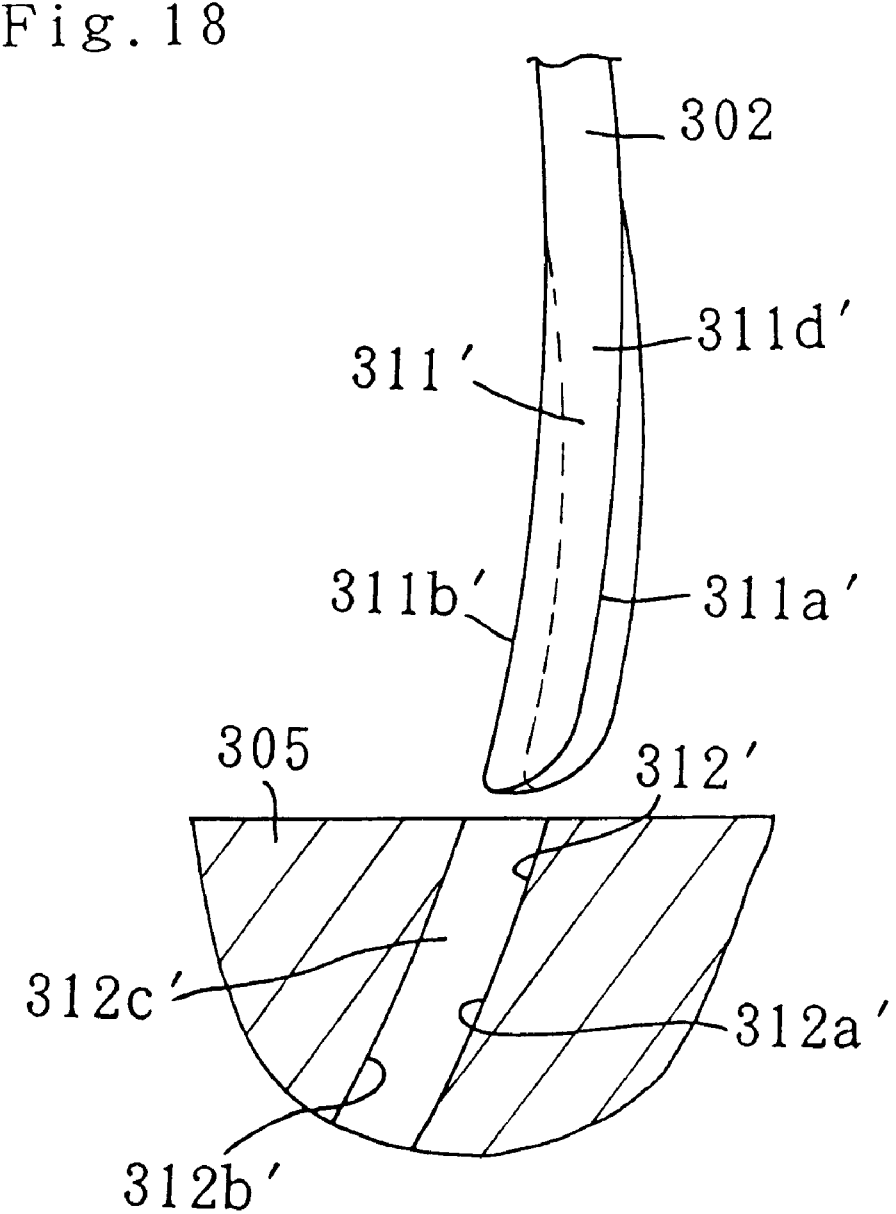
FIG. 18 is a partial cross-sectional view of the head-up display of the third embodiment of the present invention.

FIGS. 17 and 18 illustrate the third embodiment of the present invention. This embodiment differs from the above-described second embodiment in that the distance between the front and rear portions 311a' and 311b' is smaller than that between the two side portions 311c and 311d in the pair of insertion portions 311' downwardly protruding from the combiner 302, and that the pair of pits 312', into which each insertion portion 311' is extractably inserted, are provided to the housing 305 so that only their upper ends are open.

The front portion 311a' of each insertion portion 311' is in contact with the front portion 312a' of the pit 312'; the rear portion 311b' of each insertion portion 311' is in contact with the rear portion 312b' of the pit 312'; one side portion 311c' of each insertion portion 311' is in contact with one side portion 312c' of the pit 312'; the other side portion 311d' of each insertion portion 311' is in contact with the other side portion 312d' of the pit 312'. By this constitution, the combiner 302 is supported by the housing 305 via the insertion portion 311' and the pit 312'.

The front and rear portions 311a' and 311b' of each insertion portion 311' and the front and rear portions 312a' and 312b' of each pit 312' are curved along an arch. Therefore, the normal direction of the optical path changing face 302a of the combiner 302 change as the depth of insertion of each insertion portion 311' into each pit 312' changes.

Each insertion portion 311' has a notch 311e' along the vertical direction between one side portion 311c' and the other side portion 311d'. Each insertion portion 311' is elastically shiftable back and forth. As illustrated in FIG. 18, in each insertion portion 311' of a natural condition, the portion between the notch 311e' and one side portion 311c' and also the portion between the notch 311e' and the other side portion 311d' are mutually displaced to back and forth. By this constitution, when each insertion portion 311' is inserted into the pit 312', the portion between the notch 311e' and one side portion 311c' and also the portion between the notch 311e' and the other side portion 311d' are elastically shifted back and forth by being pressed against the inner face of the pit 312'. By this elastic shift, each insertion portion 311' exerts an elastic force on the pit 312'. By the frictional force generated by the elastic force, the position of the insertion portion 311' relative to the pit 312' is retained. By changing the depth of insertion of the insertion portion 311' into the pit 312' against the frictional force, the normal direction of the optical path changing face 302a of the combiner 302 can be changed steplessly. The other aspects are the same as those in the second embodiment; the portions identical to those in the second embodiment are indicated by the same symbols.

Figure 19:
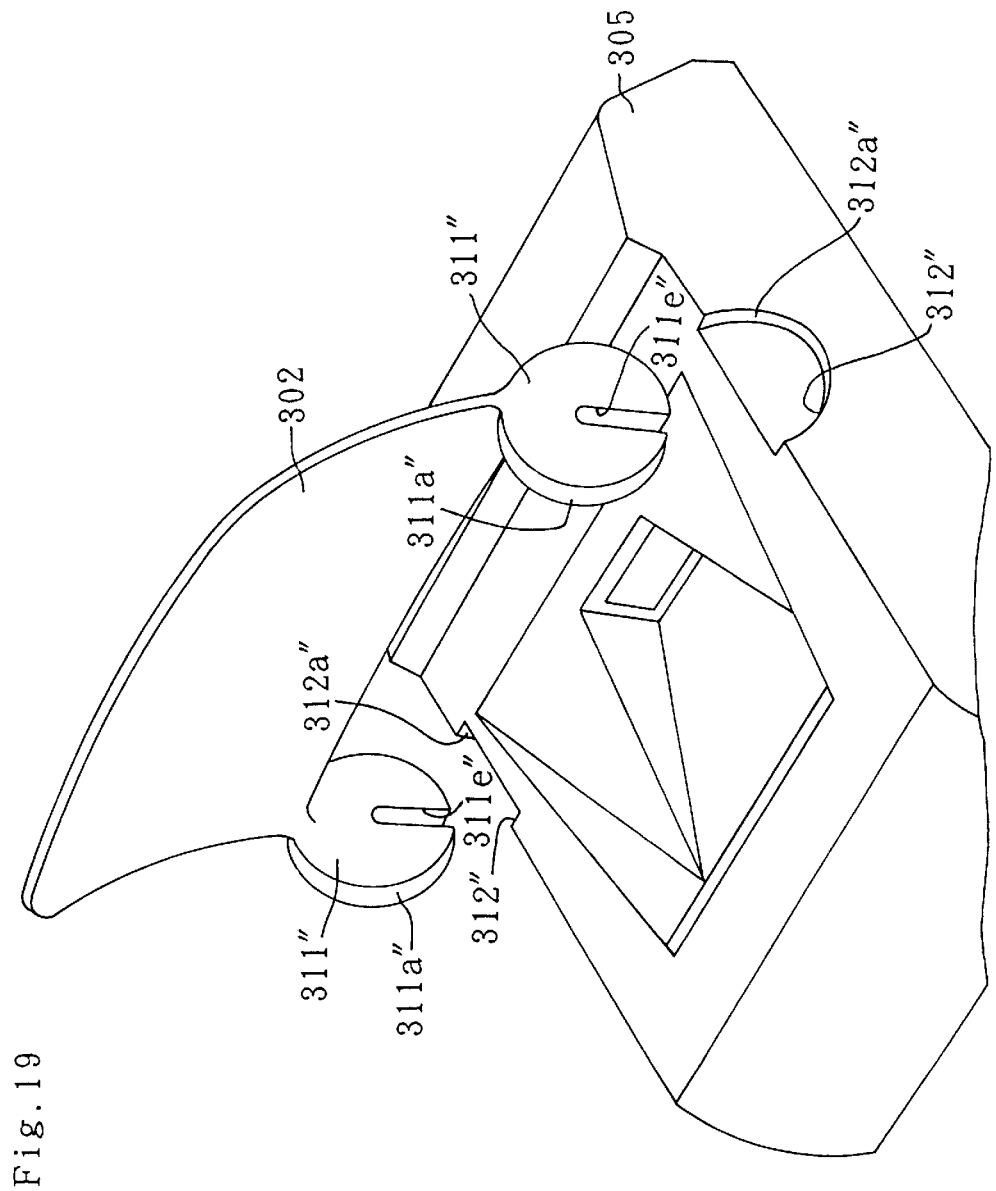
FIG. 19 is an oblique view of the head-up display of the fourth embodiment of the present invention.
Figure 20:
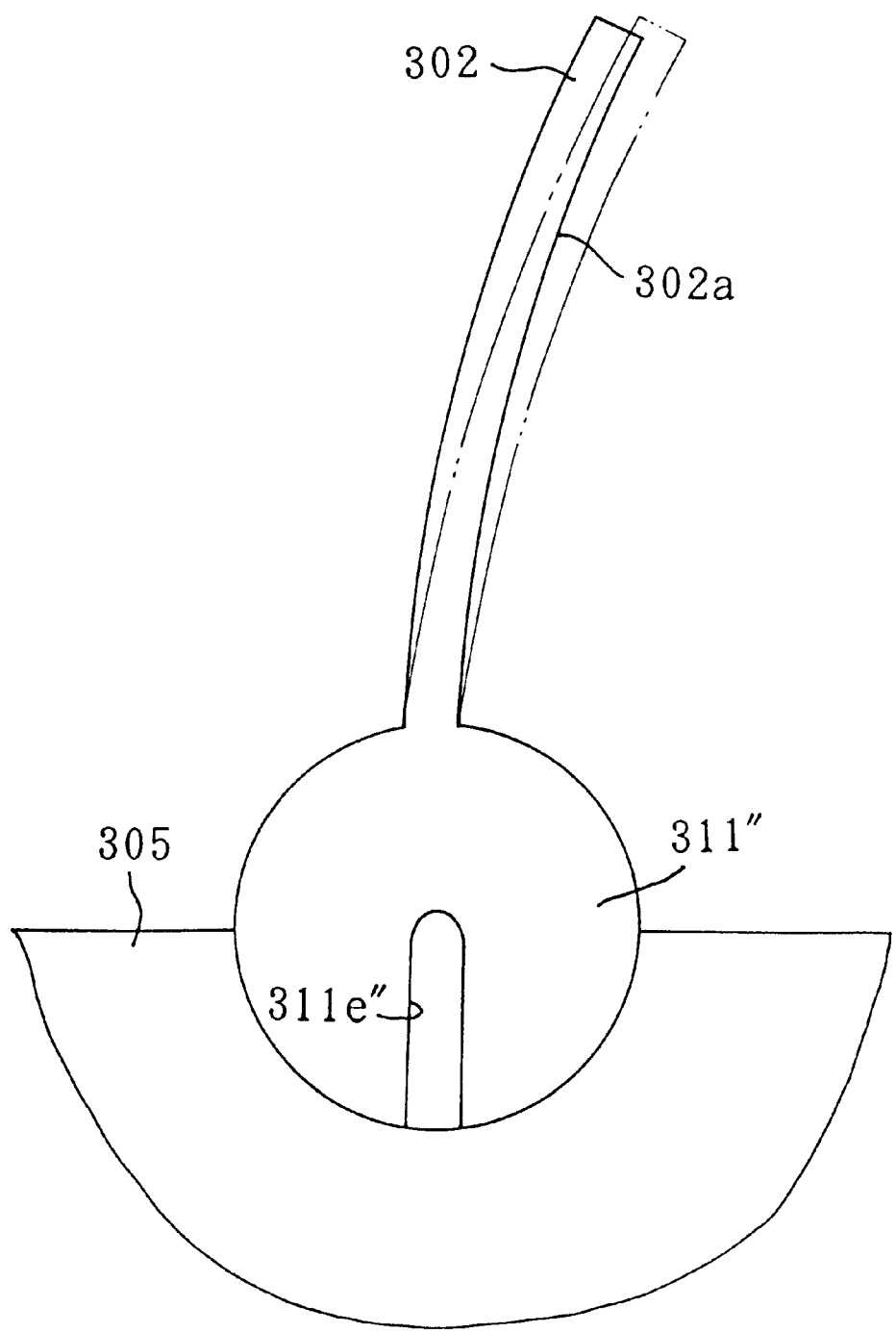
FIG. 20 is a partial side view of the head-up display of the fourth embodiment of the present invention.

FIGS. 19 and 20 illustrate the fourth embodiment of the present invention. This embodiment differs from the above-described second embodiment in that the outer face 311a" of each of a pair of insertion portions 311" downwardly protruding from the combiner 302 is formed along a cylindrical face, and that the inner face 312a" of each of a pair of pits 312", into which each insertion portion 311" is removably inserted, is formed along a cylindrical face.

As the outer face 311a" of each insertion portion 311" comes in contact with the inner face 312a" of the pit 312", the combiner 302 is supported by the housing 305 via the insertion portion 311" and the pit 312". As each insertion portion 311" rotates around the center of the cylindrical face relative to each pit 312", the normal direction of the optical path changing face 302a of the combiner 302 changes. The two-dotted chain line and solid line in FIG. 20 indicate the positions of the combiner 302 before and after the rotation.

Each insertion portion 311" is elastically shiftable in the radial direction, because having a notch 311e". In each insertion portion 311" of a natural condition, the outside diameter of each insertion portion 311" is greater than the diameter of the cylinder, along which the inner face 312a" of pit 312" is placed. By this constitution, when each insertion portion 311" is inserted into the pit 312", each insertion portion 311" is elastically deformed in the radial direction. By this elastic deformation, each insertion portion 311" exerts an elastic force on the pit 312". By the frictional force generated by the elastic force, the position of the insertion portion 311" relative to the pit 312" is retained. By rotating the insertion portion 311" relative to the pit 312" against the frictional force, the normal direction of the optical path changing face 302a of the combiner 302 can be changed steplessly.

Figure 21:
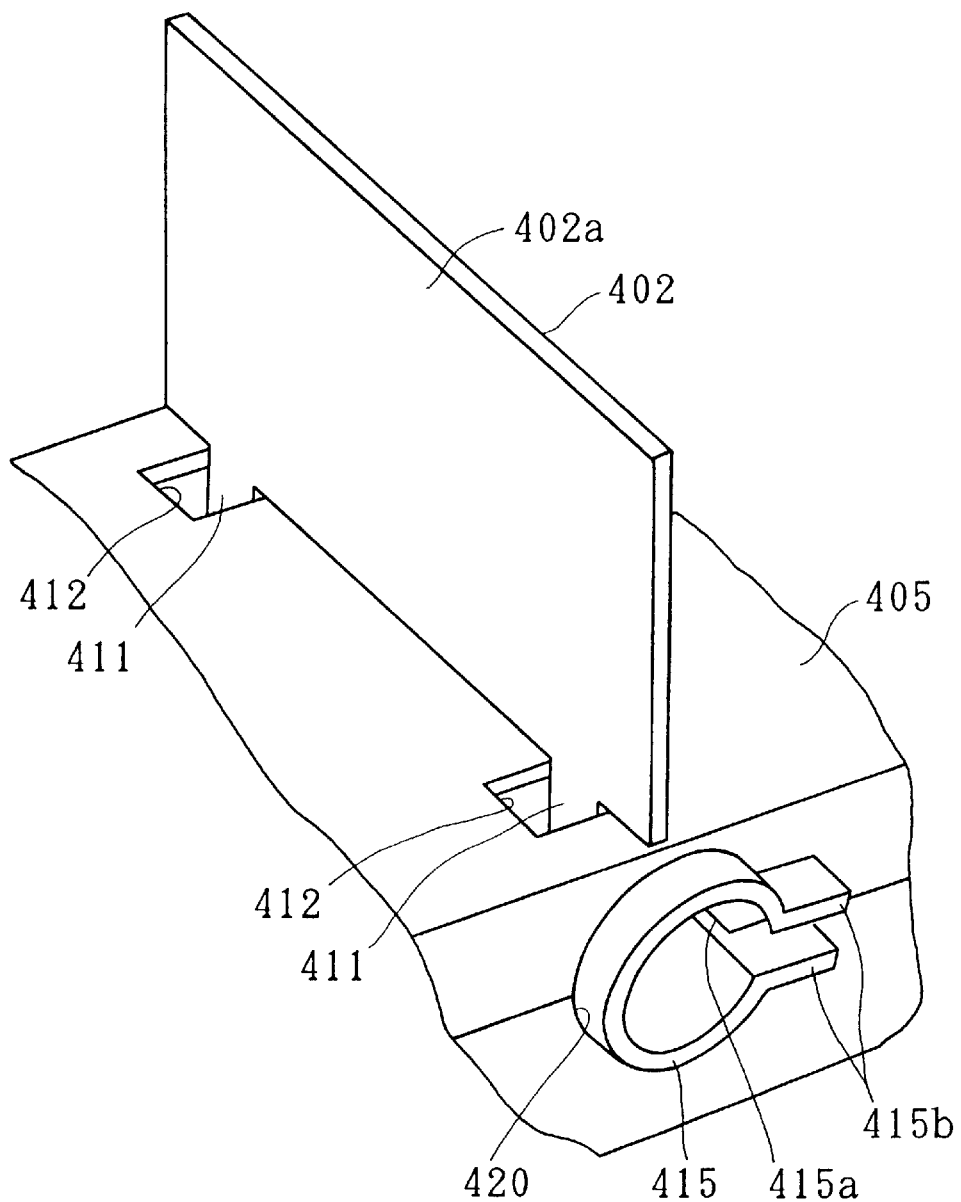
FIG. 21 is a partial oblique view of the head-up display of the fifth embodiment of the present invention.

FIG. 21 illustrates the fifth embodiment of the present invention. This embodiment differs from the above-described fourth embodiment in that a pair of insertion portions 411 downwardly protruding from the combiner 402 are inserted into holes 420 formed in the housing 405. Each insertion portion 411 is joined to a ring-shaped operating element 415. The operating element 415 is rotatably fitted into a retention hole 420 formed in the housing 405. The operating element 415 has a split groove 415a to permit its elastic deformation in the radial direction. By the elastic deformation, the operating element 415 exerts an elastic force on the inner peripheral face of the retention hole 420. By the frictional force generated by the elastic force, the position of the insertion portion 411 is retained. The operating element 415 is provided with a holding portion 415a. By rotating the operating element 415 against the frictional force, the normal direction of the optical path changing face 402a of the combiner 402 can be changed.

Figure 22:
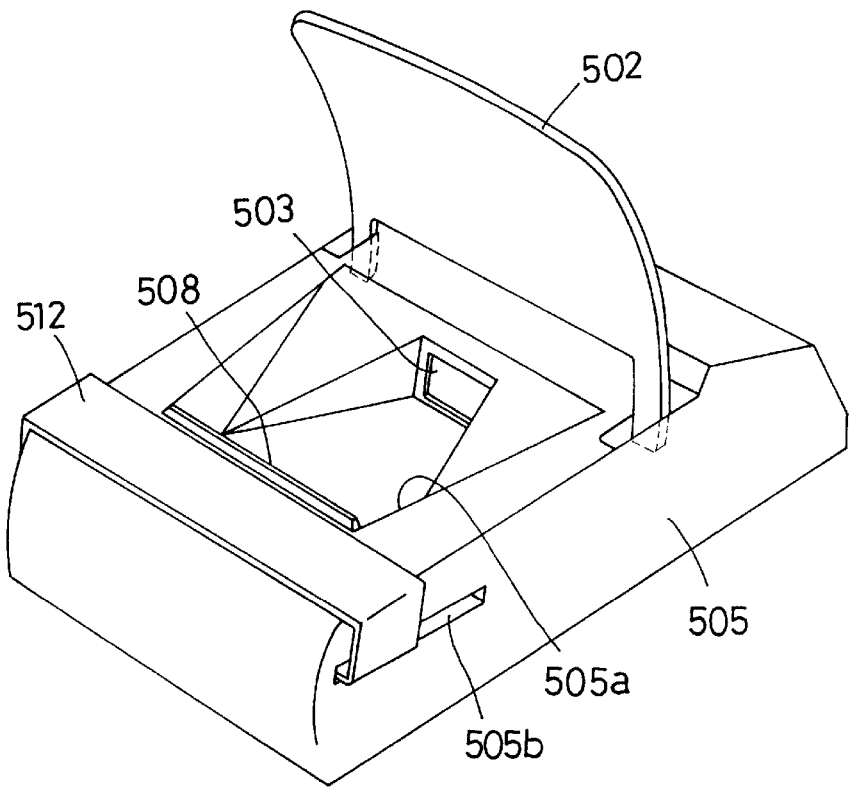
FIG. 22 (1) is an oblique view of the head-up display of the sixth embodiment of the present invention in use.
Figure 22:
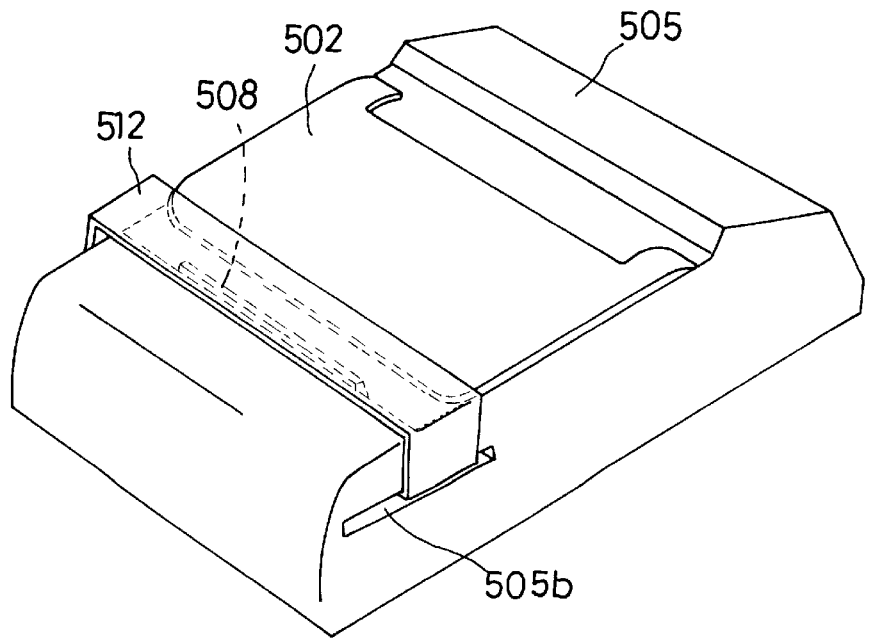

FIGS. 22 (1) and 22 (2) illustrate the sixth embodiment of the present invention. In this sixth embodiment, like in the above-described first embodiment, the combiner 502 is capable of shifting between the use position shown in FIG.

22 (1) and the housing position shown in FIG. 22 (2) by rotating around the left-right axis. The combiner 502 opens the beam outlet 505a of the housing 505 at the use position and closes the front side of the beam outlet 505a at the housing position. Also, the housing 505 is provided with a guide groove 505b. Via the guide groove 505b, a mobile cover 512 is attached to the housing 505 so that it is shiftable back and forth. The mobile cover 512 displaces itself between the opening position shown in FIG. 22 (1) and the closing position shown in FIG. 22 (2) by the shift. The mobile cover 512 opens the beam outlet 505a of the housing 505 at the opening position and closes the rear side of the beam outlet 505a at the closing position. The mobile cover 512 is located above a mirror 508 which reflects the image displaying light projected by the display element 503 at the closing position. A protecting member, such as a cushion material, is attached to the lower face of the mobile cover 512 to prevent the mirror 508 from being damaged by the mobil cover 512 at the closing position. By closing the beam outlet 505a with the combiner 502 and the mobile cover 512 as described above, the back and forth dimensions of the beam outlet 505a can be increased. The distance between the display element 503 and the mirror 508 and also the distance between the mirror 508 and the combiner 502 at the use position can therefore be increased. Therefore, the optical path of the image displaying light can be lengthened, so that the virtual image, that is the subject of observation, is formed far from the observer. Also, because the height of the combiner 502 at the use position can be decreased, the view is not obstructed by the combiner. In addition, entry of dust into the housing 505 can be prevented. The mobile cover 512 can rotate as in the first embodiment and can displace itself up and down.

Figure 23:
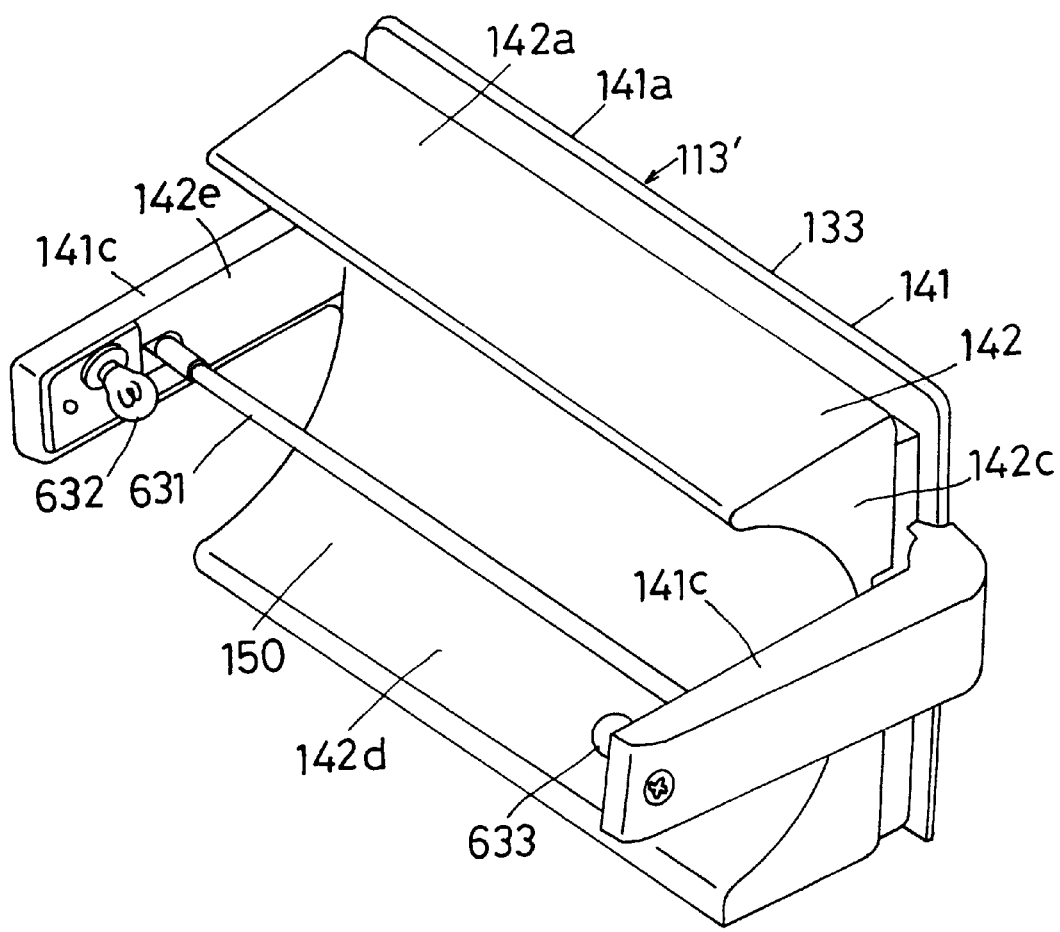
FIG. 23 is an oblique view of the light source for backlight of the head-up display of the seventh embodiment of the present invention.

FIG. 23 illustrates the light source 113' for backlight of the seventh embodiment of the present invention. This embodiment differs from the above-described first embodiment in that a semi-hot tube is used as the fluorescent tube 631. This semi-hot tube permits increased luminance and reduced size, in comparison with hot or cold cathode ray tubes. Since the semi-hot tube has a narrow range of light intensity control, a pair of auxiliary light bulbs 632 and 633 are provided. The light intensities of the fluorescent tube 631 and the two auxiliary light bulbs 632 and 633 are controlled according to external luminance. When the external luminance is low, the fluorescent tube 631 is turned off, while the two auxiliary light bulbs 632 and 633 are turned on. The fluorescent tube 631 is placed closer to the backlight reflecting surface 150 than the two auxiliary light bulbs 632 and 633. The two auxiliary light bulbs 632 and 633 are supported by a support portion 133 in the vicinities of the both ends of the fluorescent tube 631 to allow efficient utilization of the light from the fluorescent tube 631. The other aspects are the same as those in the first embodiment; the portions identical to those in the first embodiment are indicated by the same symbols.

What is claimed is:

1. A head-up display, comprising:

a combiner to be arranged in front of an observer, external light passing through the combiner; and a display element which projects image displaying light from its image displaying face;

wherein a virtual image, that is a subject of observation, is formed in front of the combiner by changing the optical path of the image displaying light by the combiner;

wherein an optical component facing the image displaying face is provided so that the image displaying light is introduced to the combiner by changing the optical path of the image displaying light; and wherein the optical component diverges incident light which includes the external light.

2. The head-up display according to claim 1, wherein:

the optical path changing face of the optical component is arranged so as to be inclined with respect to the vertical direction to allow the image displaying light to ascend as the light goes forward by changing the optical path; and wherein the image displaying face is arranged so as to be inclined with respect to the vertical direction to allow itself to depart from the optical component as it descends.

3. The head-up display according to claim 2, wherein:

the optical path changing face of the optical component change the optical path of the external light, which passes through the combiner, so that the external light does not again go to the combiner.

4. The head-up display according to claim 1, wherein:

the optical path of the image displaying light, which is projected from any one point of the display element, from the optical component to the combiner is located above the optical path of the image displaying light from the projection point to the optical component and also below the optical path of the image displaying light from the combiner to the observer's pupil.

5. The head-up display according to claim 1, wherein:

the combiner comprises a body, and a reflecting layer which covers one face of the body;

wherein at least one side of the body is configured with a platy material made of synthetic resin;

wherein: the platy material is covered with a coating which is harder and smaller in thermal expansion coefficient than the platy material;

wherein the reflecting layer is formed on the coating;

wherein the reflecting layer is configured with a plurality of laminated films, which are smaller in thermal expansion coefficient than the platy material and have mutually different refractive indexes; and wherein each of the films has residual compressive stress at normal temperature.

6. The head-up display according to claim 1, wherein:

the image displaying light is projected from a liquid crystal display element having a backlight device;

wherein the light source for backlight of the liquid crystal display device has a fluorescent tube, a driving circuit for the fluorescent tube, a lead which connects the fluorescent tube to the driving circuit, and a support portion;

wherein the light source for backlight is made as a unit attachable to, and detachable from a housing which houses the liquid crystal display element;

wherein the fluorescent tube is supported by the support portion so that it is arranged in a space outside the support portion;

wherein the driving circuit and the lead are arranged in a space inside the support portion; and wherein the outer surface of the support portion serves as a backlight reflecting surface which reflects the light beam for backlight generated by the fluorescent tube.

7. The head-up display according to claim 6, wherein:

at least the outer surface of the support portion is configured with a shielding material capable of shielding electromagnetic waves, and the shielding material constitutes the backlight reflecting surface.

8. The head-up display according to claim 1, wherein:

the image displaying light is projected from a liquid crystal display element; and wherein the display element has a transmission type monochromatic simple matrix liquid crystal display device whose liquid crystal action mode is the BTN mode, a backlight device capable of changing the light emission wavelength peak of the light which irradiates the liquid crystal display device, and a controller which synchronizes the image displaying timing on the liquid crystal display device and the light emission timing at the desired light emission wavelength peak in the backlight device.

9. The head-up display according to claim 1, wherein:

one of the housing and the combiner is provided with an insertion portion;

wherein the other of the housing and the combiner is provided with a pit into which the insertion portion is extractably inserted; and wherein the combiner is supported by the housing via the insertion portion and the pit.

10. The head-up display according to claim 9, wherein:

the contact portions of the insertion portion and the pit are curved so that the normal direction of the optical path changing face of the combiner changes as the depth of insertion of the pit into the insertion portion changes.

11. The head-up display according to claim 9, wherein:

the outer face of the insertion portion and the inner face of the pit are formed along a cylindrical face so that the normal direction of the optical path changing face of the combiner changes as the insertion portion rotates relative to the pit.

12. The head-up display according to claim 9, wherein:

the insertion portion is capable of exerting an elastic force on the pit, and the position of the insertion portion relative to the pit can be retained by the frictional force generated by the elastic force.

13. The head-up display according to claim 10, wherein:

one of the insertion portion and the pit is provided with a plurality of grooves along the direction of insertion of the insertion portion into the pit;

wherein a retention element having a projection, which can be fitted into each groove, is attachable to, and detachable from the other of the housing and the combiner; and wherein the projection is fitted into any one of the grooves to retain the position of the insertion portion relative to the pit.

* * * * *